Oct. 20, 1953

D. GONDA ET AL 2,655,978

METHOD AND MEANS FOR MANUFACTURING
CORRUGATED PLASTIC LAMINATES

Filed Dec. 23, 1950

Inventors.
Desire Gonda.
Alfred Ansell Hodge.
By
Ward, Crosby & Neal
Attorneys

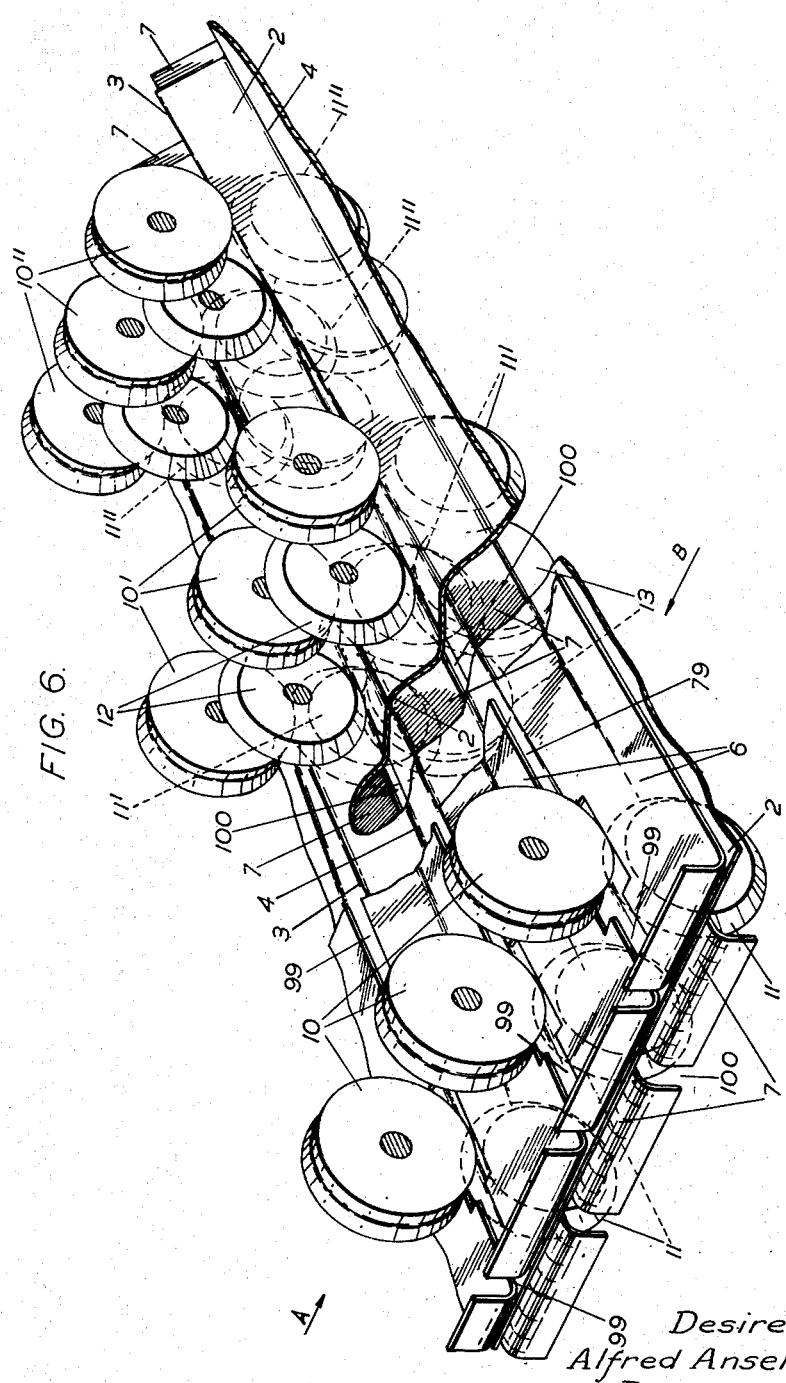

Oct. 20, 1953   D. GONDA ET AL   2,655,978
METHOD AND MEANS FOR MANUFACTURING
CORRUGATED PLASTIC LAMINATES
Filed Dec. 23, 1950                    19 Sheets-Sheet 3

Inventors.
Desire Gonda.
Alfred Ansell Hodge.
By Ward, Crosby & Neal
Attorneys.

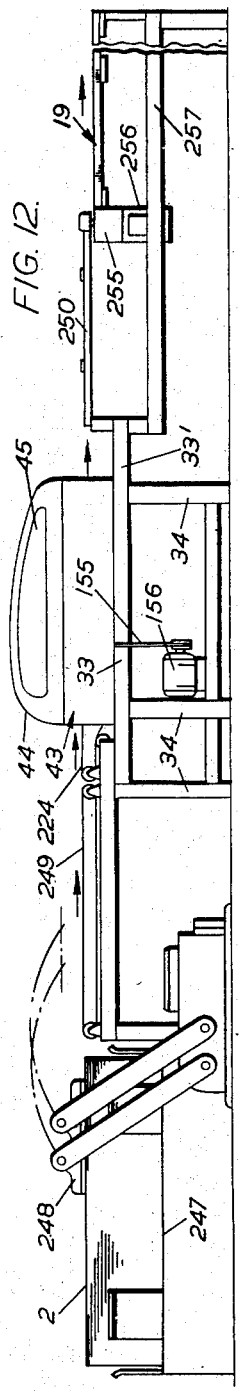

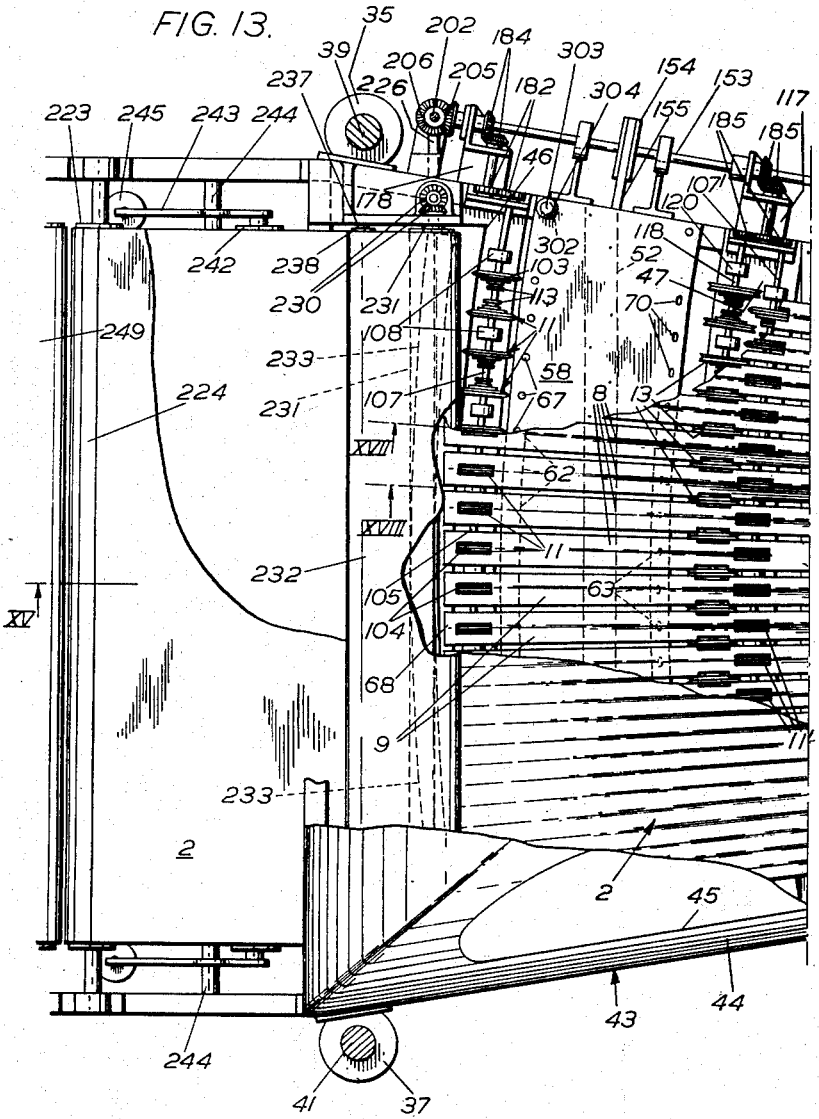

Oct. 20, 1953
D. GONDA ET AL
2,655,978
METHOD AND MEANS FOR MANUFACTURING
CORRUGATED PLASTIC LAMINATES
Filed Dec. 23, 1950
19 Sheets-Sheet 10
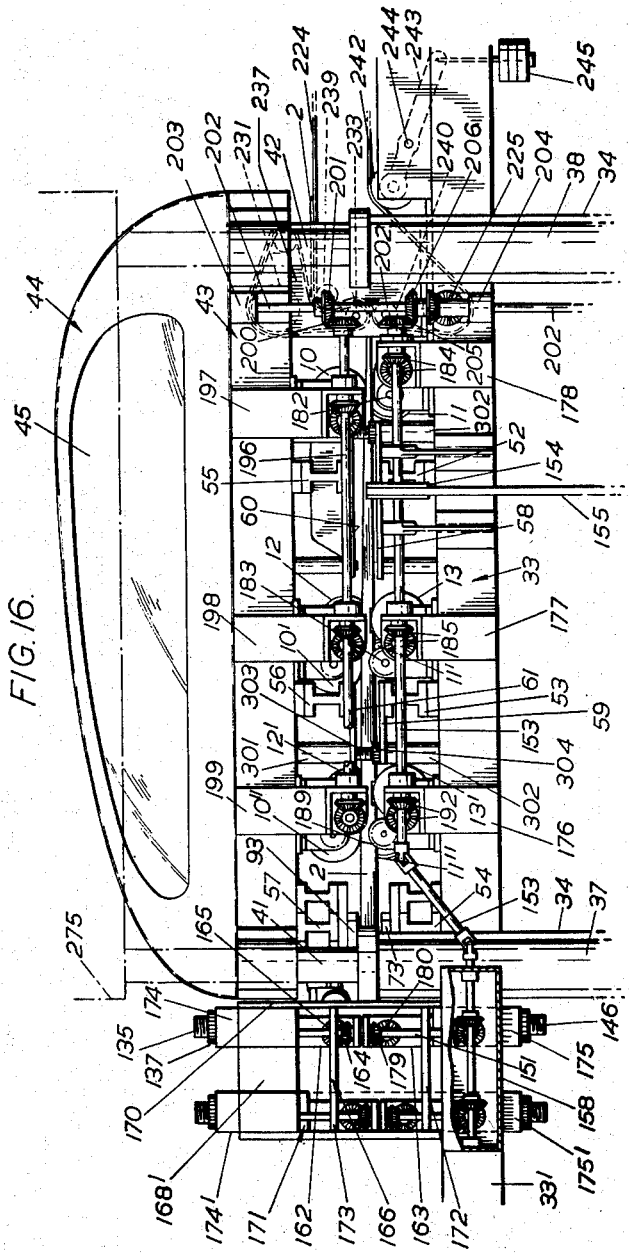
Inventors
Desire Gonda,
Alfred Ansell Hodge.
By
Ward, Crosby + Neal
Attorneys

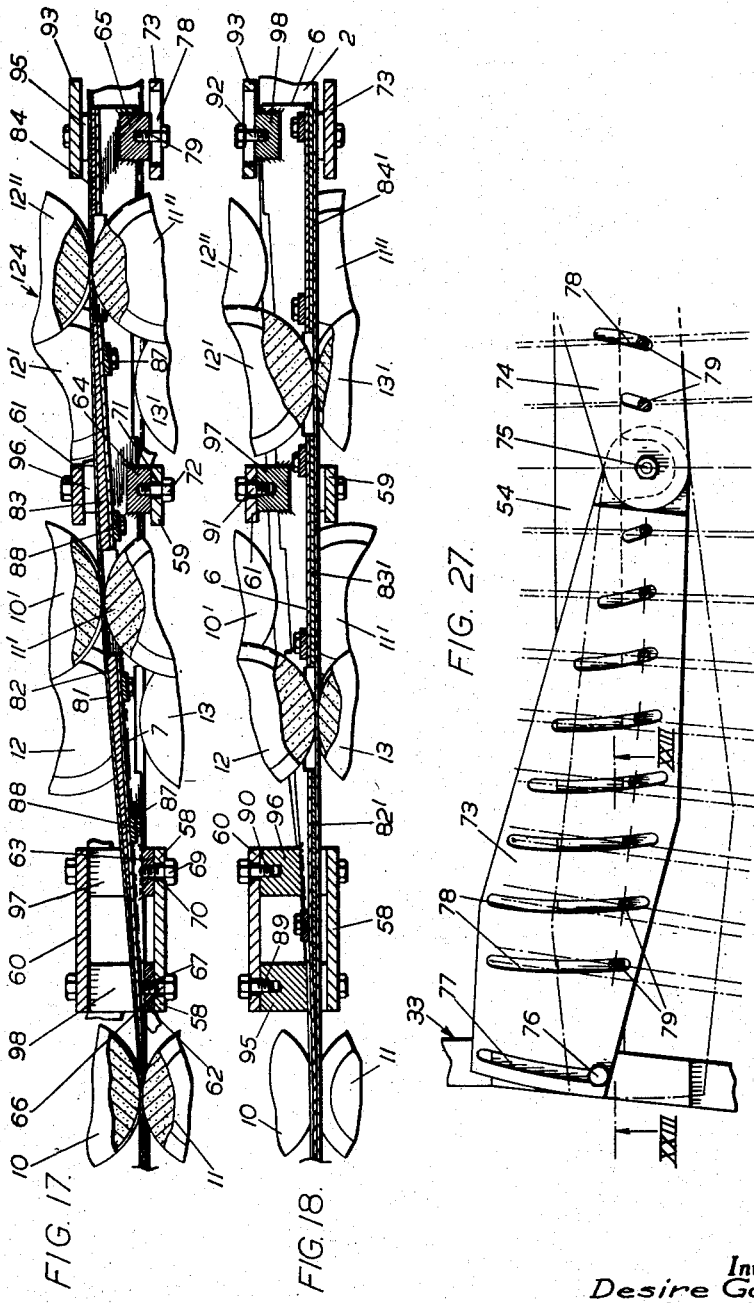

Oct. 20, 1953 D. GONDA ET AL 2,655,978
METHOD AND MEANS FOR MANUFACTURING
CORRUGATED PLASTIC LAMINATES
Filed Dec. 23, 1950 19 Sheets-Sheet 13

Inventors
Desire Gonda.
Alfred Ansell Hodge
By
Ward, Crosby & Neal
Attorneys

Inventors
Desire Gonda,
Alfred Ansell Hodge.
By
Ward, Crosby & Neal
Attorneys

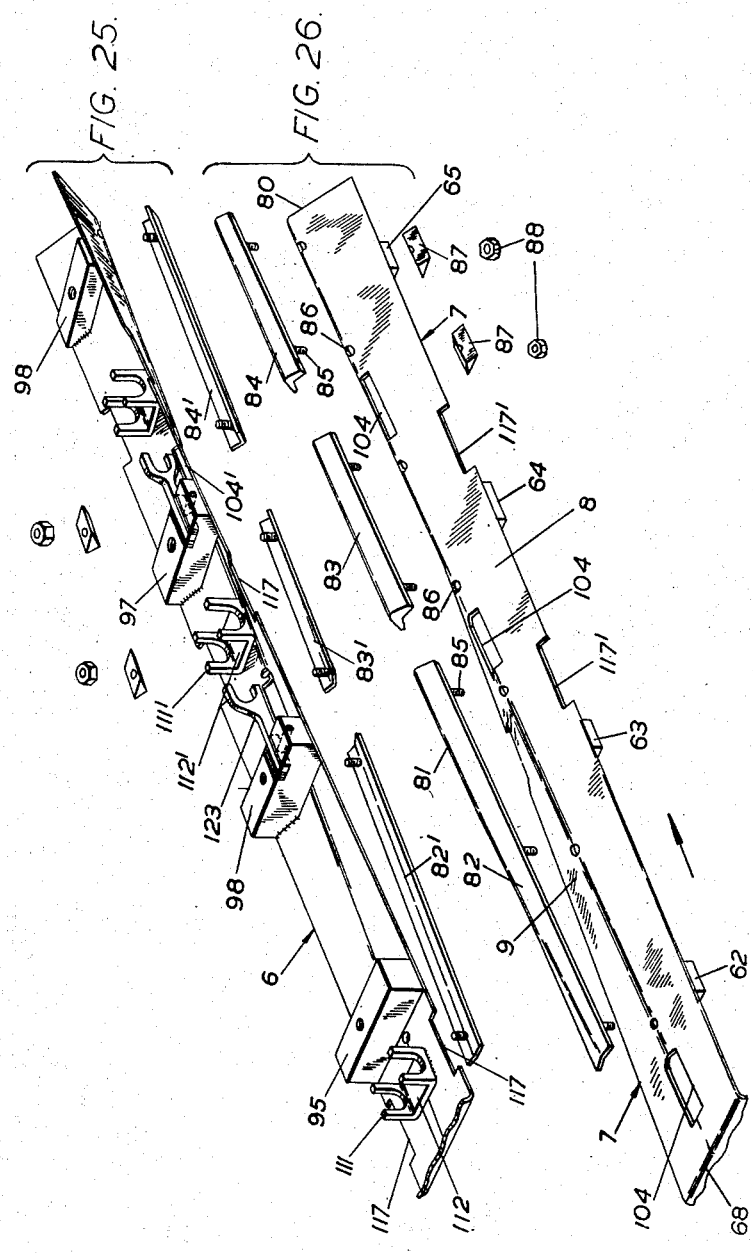

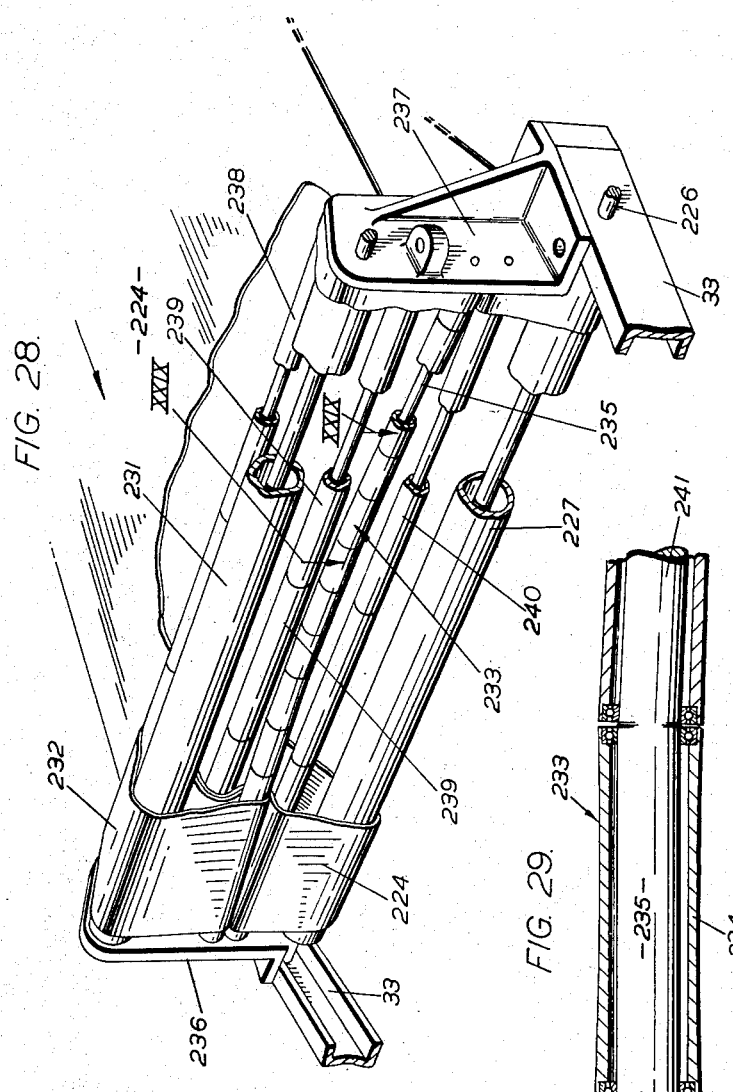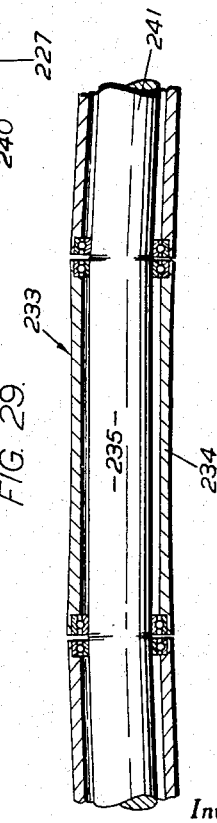
Oct. 20, 1953  D. GONDA ET AL  2,655,978
METHOD AND MEANS FOR MANUFACTURING
CORRUGATED PLASTIC LAMINATES
Filed Dec. 23, 1950  19 Sheets-Sheet 16
FIG. 28.
FIG. 29.
Inventors
Desire Gonda.
Alfred Ansell Hodge.
By
Ward, Crosby & Neal
Attorneys Oct. 20, 1953   D. GONDA ET AL   2,655,978
METHOD AND MEANS FOR MANUFACTURING
CORRUGATED PLASTIC LAMINATES
Filed Dec. 23, 1950   19 Sheets-Sheet 17

Inventors
Desire Gonda.
Alfred Ansell Hodge.
By
Ward, Crosby & Neal
Attorneys

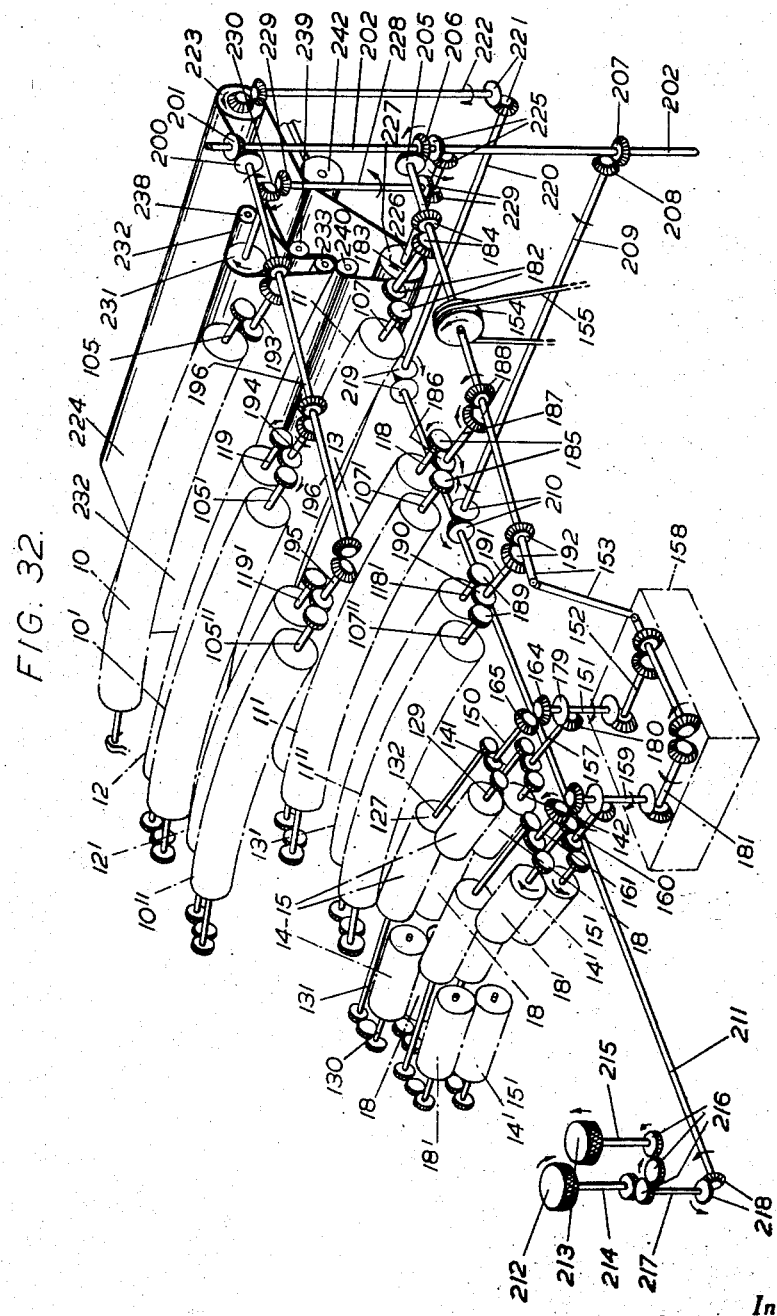

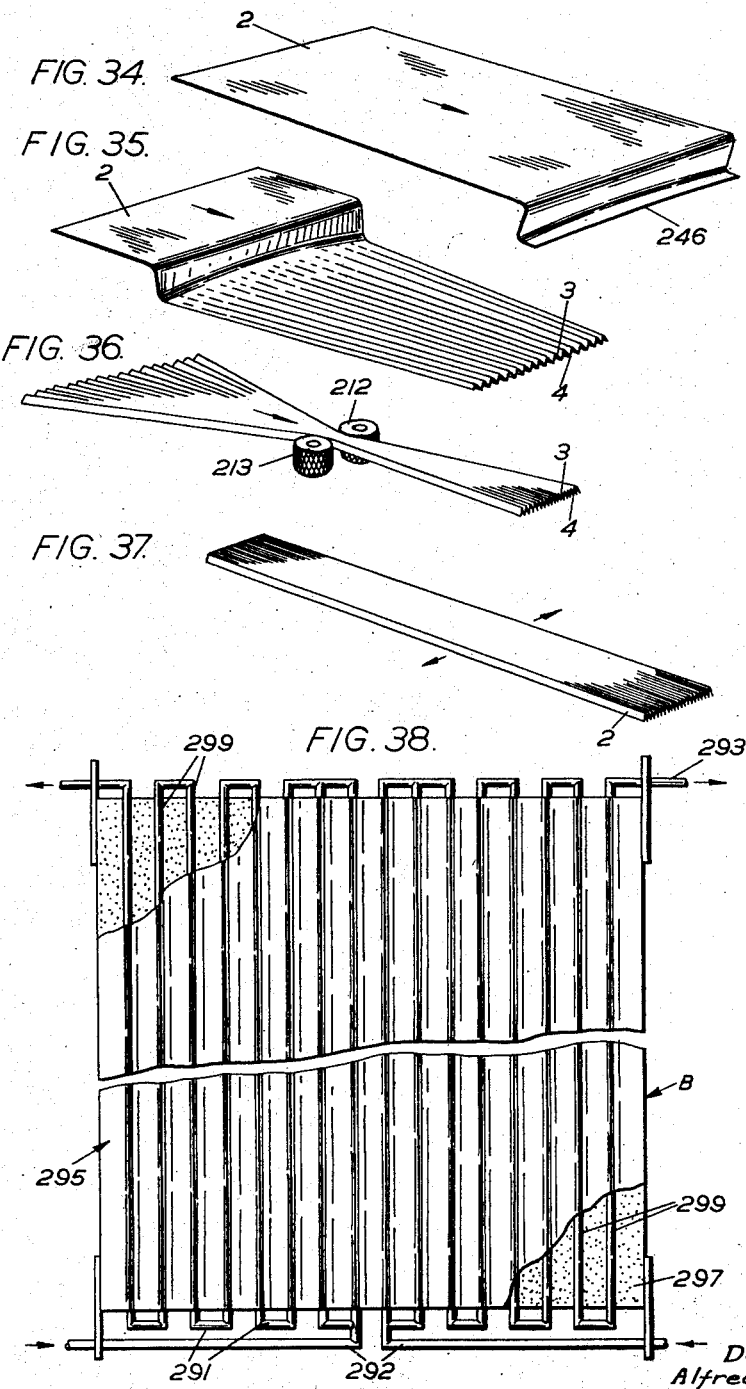

Patented Oct. 20, 1953

2,655,978

UNITED STATES PATENT OFFICE 2,655,978

METHOD AND MEANS FOR MANUFACTURING CORRUGATED PLASTIC LAMINATES

Desiré Gonda and Alfred Ansell Hodge, New Hythe, near Maidstone, England, assignors to Holoplast Limited, New Hythe, near Maidstone, England, a British company Application December 23, 1950, Serial No. 202,459
In Great Britain December 29, 1949

21 Claims. (Cl. 154—30)

This invention concerns a method and means for manufacturing corrugated plastic laminates, and the products of such manufacture, an object of the invention being to produce corrugated plastic laminates which can be used in place of corrugated metal, asbestos, and like sheets, plates or panels in, for example, the building industry. Another object of the invention is to provide corrugated laminates which are resistant to corrosion in acid atmospheres, fire resistant, vermin proof, wind- and weather-proof, and which have a high strength/weight ratio, whilst a still further object of the invention is to enable corrugated laminates to be produced in attractive colours, such as, for example, pastel shades.

More particularly, the object of the invention is to produce the said corrugated plastic laminates each from an assembly of superposed sheets of fibrous material such as, for example, paper, of an initially relatively flexible form and which bear or are impregnated with (and all hereinafter referred to inclusively as being "impregnated" with) an uncured thermo-setting plastic or resin, hereinafter inclusively referred to as "thermo-setting resin," the said sheets being, during manufacture of the corrugated laminate therefrom, heated and pressed to shape the sheets to the required final corrugated form and to consolidate the sheets of the assembly and cure or set the thermo-setting resin contained in the assembly.

According to this invention there is provided a method of manufacturing a corrugated plastic laminate from fibrous sheet material impregnated with a thermo-setting resin, such method comprising pre-forming the fibrous sheet material to a pleated or preliminarily corrugated form approximately corresponding to the final corrugated form to be given to the plastic laminate, assembling a number (sufficient to form a laminate of the required thickness) of sheets of the said pre-formed material in superposed relationship and then compressing the laminate assembly thus produced between co-operating heated moulds having corrugated surfaces (whose corrugations conform in their dimensions and shape to those to be produced in the finished plastic laminate) to impart the required final corrugated form to the laminate assembly and to consolidate the sheets, of which the assembly is composed, into a single integral corrugated laminate.

The said fibrous sheet material will preferably comprise absorbent paper such as, for example, kraft paper, but it may be of any other suitable form such as, for example, absorbent textile materials, wood veneer, asbestos, woven glass or other fibres, or a combination of two or more of these materials. However, where the fibrous sheet material has a fibre structure running predominantly in one direction, the sheet material will preferably be used in such a way that the said predominating fibre direction will be at right angles to the lengths of the corrugations formed in the material when the same is converted into corrugated plastic laminates.

The term "consolidated" is used herein in the sense in which it is normally employed in the plastics industry, namely to mean the result achieved by pressing the thermo-setting resin impregnated sheets of a laminate assembly together whilst subjecting the assembly to heat which causes the flow of the resin in the sheets of the assembly and the ultimate curing of this resin to bond the compacted sheets in this condition.

According to a further feature of the invention, in or after pre-forming the fibrous sheet material to the said pleated or preliminarily corrugated form, the material is creased along parallel lines respectively centrally or substantially centrally of the crests and bases of the corrugations formed in the material thereby to impart an enduring set to the material along these lines, immediately adjoining creases so produced being spaced from one another by a distance (measured at right angles to the lengths of the creases and along the surface of the sheet) substantially equal to half the distance (measured in a similar manner) between the longitudinal centre lines of successive crests of the corrugated laminate to be produced.

By the expression "enduring set" used herein is meant a creasing of the fibrous pre-formed sheet material to such an extent as will ensure that this material will retain, with some degree of permanency, the corrugated form applied thereto without the natural resilience of the material automatically causing the latter to return to its original planary form or to a condition closely approximating to this original form, the said creasing yet not being of such a nature as to mar, or to be substantially apparent in, the final corrugated laminate to be produced from a plurality of pre-formed sheets of such material.

The said fibrous sheet materal may be pre-formed by, for example, folding or pleating it concertina fashion, along parallel straight lines extending longitudinally of the material, said folding lines forming the hereinbefore-mentioned creases but preferably, and according to a still further feature of the invention, the said pre-forming operation is effected by taking planary flexible fibrous sheet material, e. g. an oblong sheet of kraft paper which is approximately 5 feet wide by 8 feet 4 inches long where the corrugated laminate to be produced is to be 4 feet wide by 8 feet long after trimming, which has been impregnated with an uncured thermo-setting resin, and advancing this sheet material edgewise (i. e. longitudinally in the direction in which the corrugations are to extend therealong) whilst simultaneously displacing the sheet material to a progressively increasing extent transversely (and preferably perpendicularly) out of its original plane, this progressive displacement being effected along laterally spaced straight lines extending longitudinally of the sheet at predetermined positions corresponding to the lines along which are to extend the crests and/or bases of the corrugations to be formed in the sheet material, whilst also simultaneously progressively drawing the sheet material laterally inwardly to compensate for the said progressively increasing displacement of the material transversely from its original plane, so as thereby to avoid harmful stressing of the sheet material in the direction of its width as a result of the said transverse displacement of the material.

The transverse displacement of the sheet material from its original plane may be effected only along alternate straight lines corresponding to the crests (or bases) of the corrugations to be formed in the material whilst the parts of the sheet material which are to form the bases (or crests) of the corrugations are maintained, during the pre-forming operation, in the original plane of the material along straight lines disposed centrally between the said alternate straight lines or, alternatively, the sheet material may be displaced in opposite directions from its original plane along successive straight lines.

As the said sheet material is gradually or progressively deformed to its corrugated pre-formed character, the developing individual corrugations therein will progressively increase in height or amplitude, whilst the pitch of the corrugations will simultaneously progressively diminish. Consequently the effective overall width of the material will progressively decrease, the said decrease in width being such as to relieve the material, during all stages of the pre-forming operation, of any stressing, in the direction of its width, such as would detrimentally affect its physical properties to a substantial extent.

Although the said pre-forming of the sheet material may be effected manually by careful manipulation and the laminate assemblies thus prepared, wholly by manual means, ready for the pressing operation, nevertheless for the purpose of achieving practical inexpensive volume production, a novel machine has been devised, the presently preferred form of which is subsequently disclosed herein.

Thus according to a further feature of the invention there is provided a machine for pre-forming sheet material to a pleated or corrugated form, such machine comprising means for feeding the sheet material edgewise through the machine in the direction in which the corrugations are to extend along the material, and means for simultaneously displacing the sheet material, to a progressively increasing extent as it passes through the machine, transversely out of its original plane along straight lines extending, at predetermined laterally spaced positions, along the sheet in the direction in which it is fed, and for also simultaneously progressively drawing the material inwardly laterally (transversely of the direction of the said lines) in order to compensate for the said progressively increasing displacement of the material transversely from its original plane, thereby to avoid harmful stressing of the material, in a direction transverse to the said lines, as a result of the said transverse displacement of the material from its original plane.

The corrugating of the said sheet material is preferably effected by the co-operative action of sheet-engaging means which, as the sheet material is advanced edgewise, act thereon along one set of laterally spaced convergent straight lines, and further sheet-engaging means which similarly act upon the sheet material along a further plurality of laterally spaced convergent straight lines alternating with the first-mentioned straight lines and centrally disposed between the latter, at least the means acting on said sheet material along one of the said sets of straight lines being arranged to displace the material perpendicularly out of its own plane to a progressively increasing extent as the material is advanced through the machine.

The said means for progressively displacing the said sheet material transversely may include co-operating or nesting guide plates adapted for the passage of the said sheet material between them and which are shaped in cross-section to the progressively increasing corrugated form to be imparted to the sheet material passed therebetween. Thus two series of side-by-side convergent guide plates may be provided in spaced relationship to furnish between them a gap for the free passage of the sheet material edgewise between the guide plates of the two series, said guide plates being so shaped that the said gap is of substantially uniplanar form at the feed end of the machine but progressively assumes from this end a transversely corrugated form, the corrugations gradually increasing in amplitude and decreasing in pitch towards the discharge end of the machine.

Alternatively, however, the said sheet-engaging means may comprise a plurality of fixed vertical laterally spaced convergent guide plates, alternate guide plates having straight horizontal lower edges adapted to engage, for example, on the upper surface of the sheet material being fed through the machine in the direction of the length of the said guide plates, whilst the intermediate guide plates are adapted to engage below the sheet material and have their upper edges gradually inclining upwardly towards the discharge end of the machine so that, as it passes through the machine, the sheet material is, where it engages the upper edges of the said intermediate guide plates, progressively displaced upwardly out of its original plane, the sheet material being simultaneously progressively reduced in overall width.

In another alternative arrangement, instead of providing a machine for pre-forming the sheet material progressively to the preliminarily corrugated or pleated form, a machine may be provided in which separate sheets of the sheet material are pre-formed individually, this machine comprising, for example, two sets of parallel vertical blades, the blades of one set alternating with those of the other set and the sheet being adapted to be placed between the two sets of blades and then the latter being moved relatively to one another in a direction perpendicular to the plane of the sheet thereby to displace the sheet along alternate parallel laterally spaced lines by means of the one set of blades and with respect to the intervening parts of the sheet engaged with the edges of the other set of blades, the outer parts of the sheet being, during this operation, free to move laterally inwardly, and the said guide plates preferably also being adapted automatically to move laterally towards one another as the preliminary corrugating or pleating operation proceeds.

Conveniently the said machine may also include two entirely separate series of driven feed and pre-forming wheels each including a plurality of pairs of wheels, the wheels of each pair of one series of wheels being adapted to engage the said sheet material on opposite sides thereof along one of the said sets of straight lines whilst the wheels of each pair of the other series are adapted to engage the sheet material on opposite sides thereof along the other said set of straight lines, and wherein each of the said series of pairs of wheels are arranged in a plurality of transverse rows spaced along the machine with the wheels of one of said series having those portions of their peripheries which act on the sheet material arranged in a surface transversely parallel to, but diverging along the machine (from the feed to the discharge end thereof), from the plane in which operate the corresponding portions of the peripheries of the wheels of the pairs of the other series.

Where the corrugations of the laminate are to be of the usual curvilinear wavy shape in cross-section, the corrugations of the pre-formed sheet material are conveniently made of a plane-sided V-shape in cross section and, although during their formation these corrugations gradually increase in height or amplitude, the corrugations are, in the finished pre-formed material, of uniform height or amplitude throughout their lengths.

The creasing of the corrugations of the pre-formed sheet material centrally along the crests and bases thereof, to impart the said enduring set to the corrugations after they have been fully formed, may be effected by squeezing or nipping together the adjoining marginal portions of the sides of the corrugations immediately adjacent the crests and bases thereof and such nipping operation may be conveniently effected by forcing the crests and bases respectively of the corrugations of the fibrous sheet material longitudinally between different pairs of squeezing or nipping wheels (hereinafter called "nipping wheels") acting externally upon the corrugations, the nipping wheels of each pair conveniently being resiliently urged towards one another.

Moreover, the crests and bases of the corrugations of the fibrous sheet material may be internally supported during the said nipping operation and this support may be provided by means of supporting wheels or discs each having a double-bevelled periphery which is located centrally between the peripheral marginal portions of the two nipping wheels of the co-operating pair of such wheels. Preferably the nipping wheels of each pair are bevelled marginally on their opposed surfaces to produce a peripheral flare between them which serves as a lead-in to the wheels for the corrugations to be creased thereby.

According to a further feature of the invention, after pre-forming the said sheet material to a pleated or preliminarily corrugated form and creasing it, such pleated or corrugated material which is much narrower than the original planary sheet material from which it was formed, may be confined against expansion, in a direction transverse to the said crease lines thereof, beyond a predetermined dimension which is not greater than (e. g. is two-thirds of) the corresponding dimension of the finished corrugated laminate to be produced; this confining of the pre-formed sheet material may be effected by placing it upon a supporting and restraining rack as will hereinafter be described.

According to a still further feature of the invention a plurality of the plastic laminates may be produced simultaneously between the or each pair of corrugated moulds, this being effected by stacking a plurality of the said laminate assemblies in superposed relationship with a flexible or limp separating layer, which is impermeable to, and incompatible with, the said thermo-setting resin, between successive laminate assemblies and then introducing the said stack of laminate assemblies between the said pair of corrugated moulds and applying, by means of such moulds, heat and pressure to the stacked laminate assemblies to consolidate each of them into a corrugated plastic laminate, the laminates subsequently being removed from between the corrugated moulds and separated.

By the expression "flexible or limp separating layer" used herein is meant a substantially incompressible material which will offer negligible or little resistance to deformation during the said heating and pressing operation and preferably the material used as the separating layer or layers will be a limp material such as, for example, the moisture proof cellulosic materials hereinafter referred to and which are impermeable by, and incompatible with, the resin or resins to be employed.

Preferably one of the said flexible or limp separating layers is also placed between each mould, or a cover plate thereon, and the adjacent laminate assembly.

Where the texture or form of the fibrous sheet material constituting the laminate assemblies, or at least the outer sheets of each laminate assembly, is of a suitable character, the adjacent or successive laminate assemblies will, during the said heating and pressing operation, act upon one another through the said flexible or limp separating layers as mutual surface configurating molds. Thus where the fibrous sheet material of the laminate assemblies is, as it preferably will be, kraft paper which has its fibres so distributed that each sheet formed therefrom has a large number of alternately relatively hard and soft areas or spots distributed thereover, the adjacent laminate assemblies will co-act with one another to produce a mottled, dimpled, pewter-like or hammered (all hereinafter referred to as a "hammered") configuration upon the surfaces of the finished laminates.

To provide a similarly produced configurated effect upon the laminate surfaces immediately next to the said co-operating corrugated moulds, a moulding element comprising one or more suitable fibrous laminae, such as one or more sheets or kraft paper for example, may be interposed between each mould and the immediately adjacent laminate assembly, the sheet or sheets comprising the said moulding element or elements preferably being unimpregnated with the thermo-setting resin and one of the said flexible or limp separating layers being interposed between each such moulding element and the adjacent laminate assembly.

Further features of the invention will become apparent from the following particular description of one embodiment thereof, and the appended claims.

In order that the invention may be more readily understood, the same will now be described with reference to the accompanying drawings, in which:

Figure 6 is a perspective view showing diagrammatically the conversion of a flat sheet of paper such as shown in Figure 3 into the pre-formed shape shown in Figure 4;

Figure 12 shows diagrammatically in side elevation a machine for pre-forming the sheets illustrated in Figure 3 to the shape shown in Figure 4;

Figure 4:
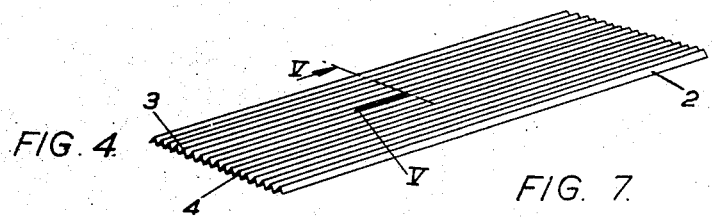
Figure 4 is a perspective view showing the sheet illustrated in Figure 3, in its pre-formed or concertina-like condition.
Figure 9:
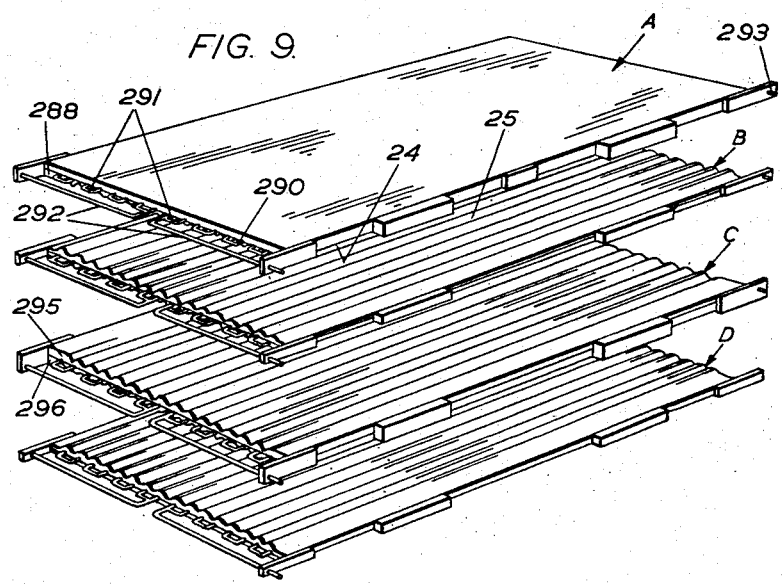
Figure 9 is a perspective view showing the heated platens or moulds of a press for producing the plastic corrugated laminates from pre-formed sheets such as shown in Figure 4.
Figure 13A:
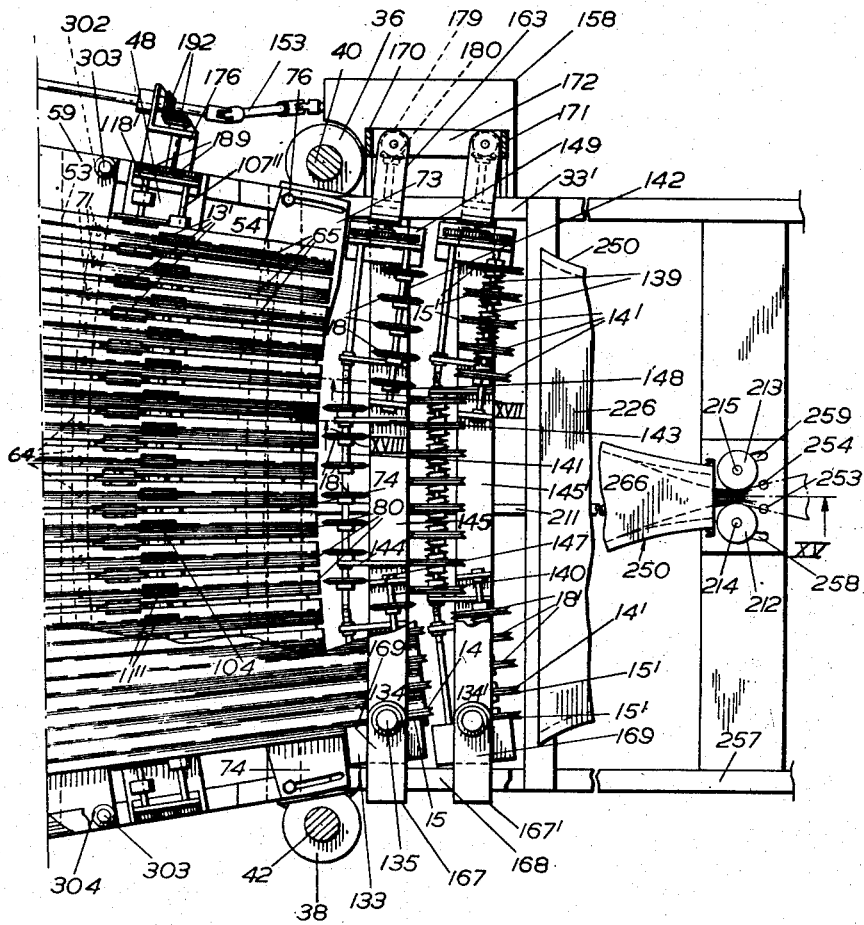
Figure 15:
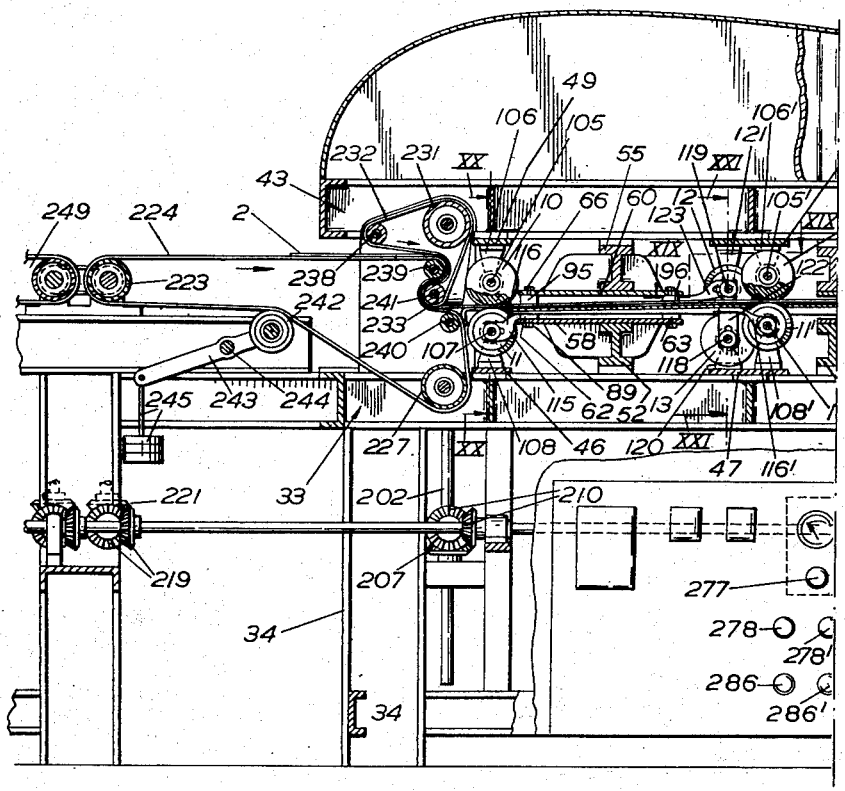
Figure 15A:
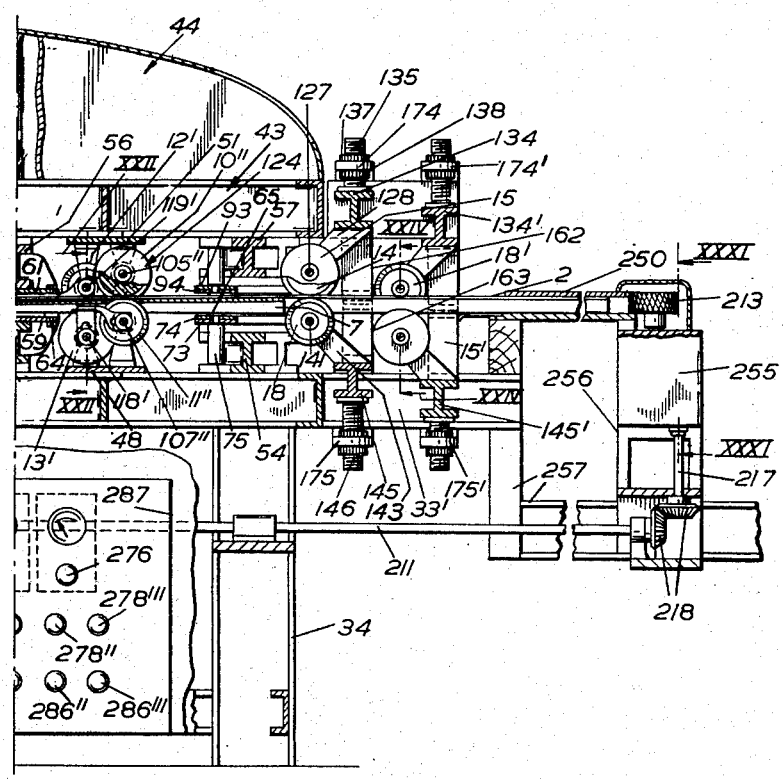
Figure 19:
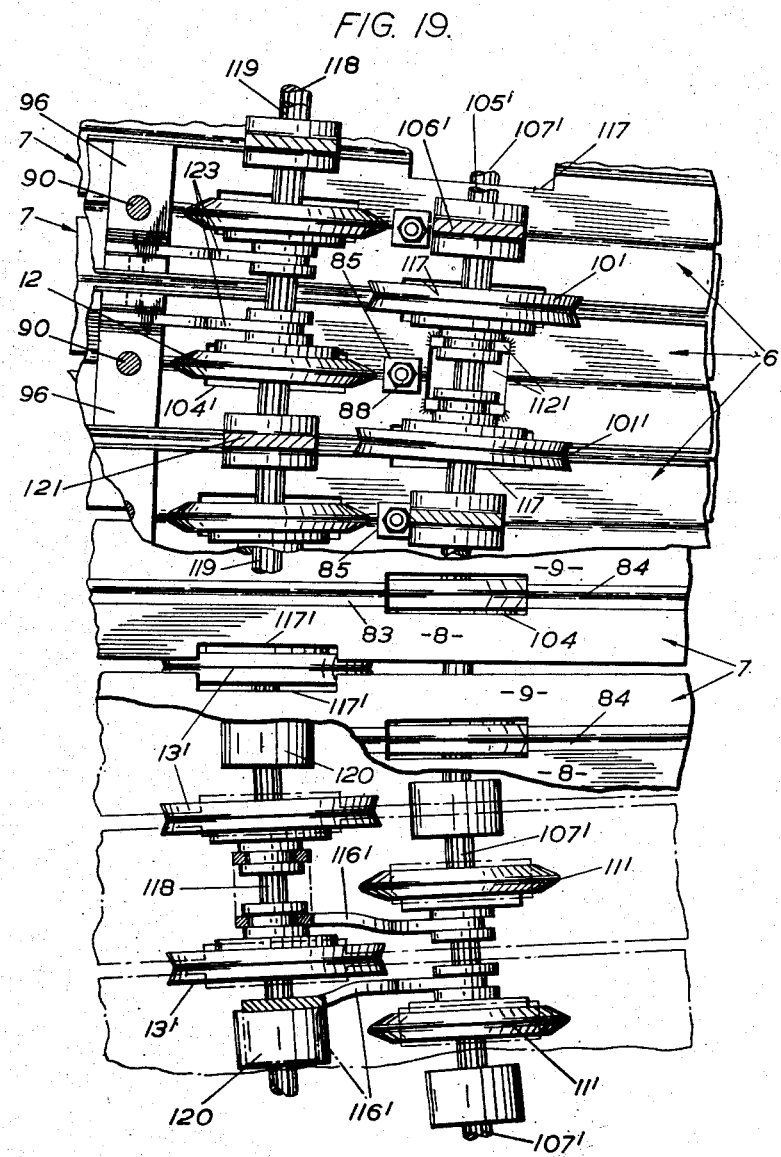
Figure 20:
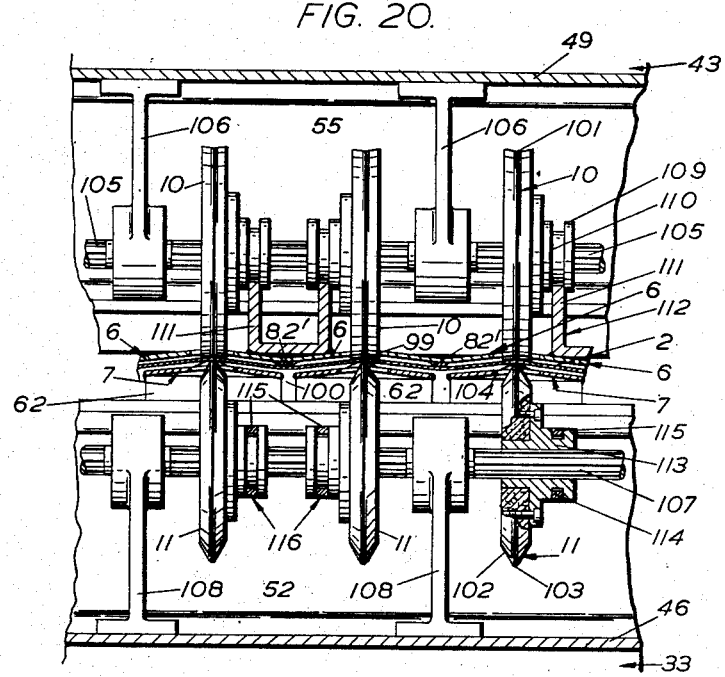
Figure 21:
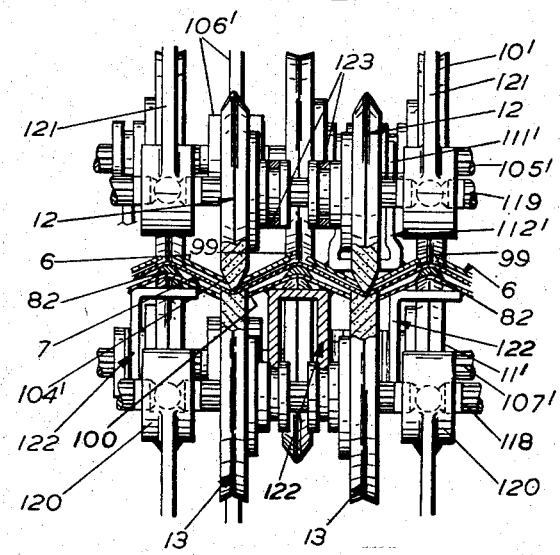
Figure 22:
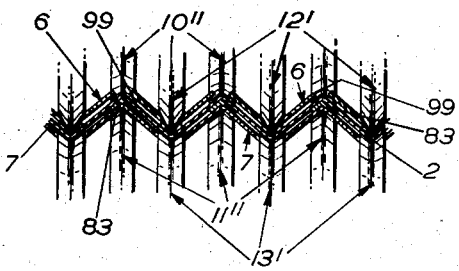
Figure 23:
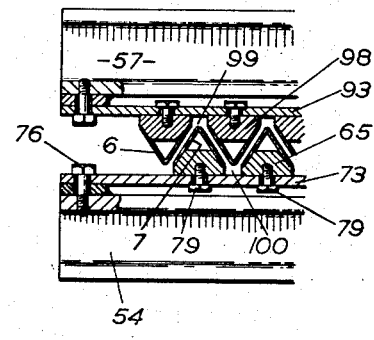
Figure 24:
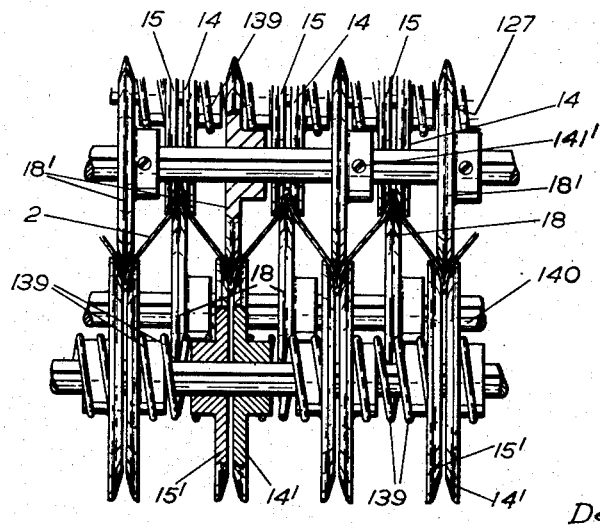
Figure 30:
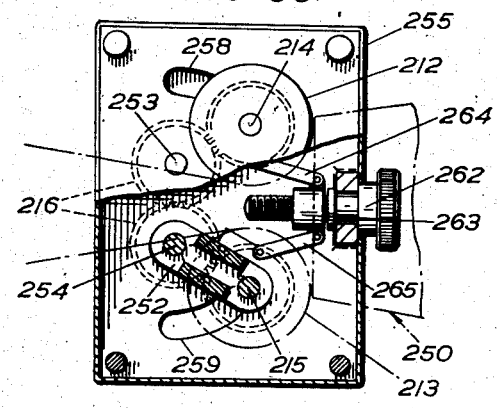
Figure 31:
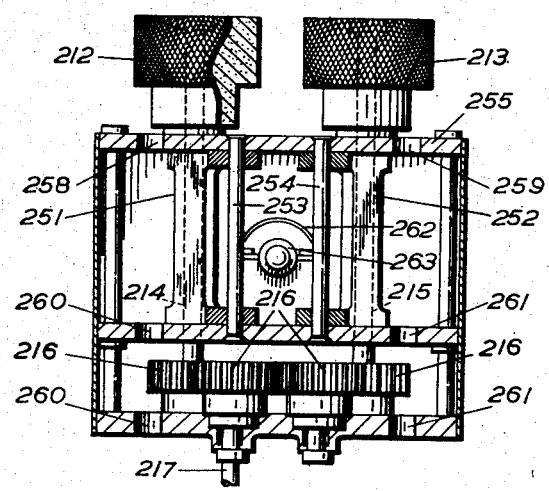
Figure 39:
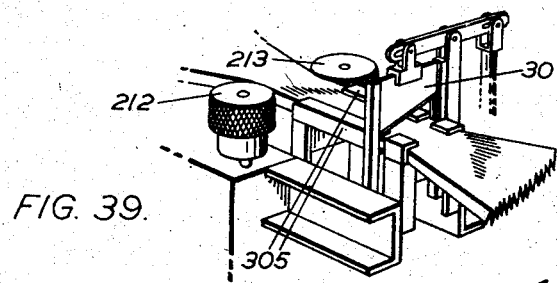

Figures 13, 13A constitute a sectional plan of the main or central part of the machine shown in Figure 12, certain parts of the machine being shown broken away more satisfactorily to illustrate the construction of the machine;

Figure 14 shows in plan the discharge casing at the right hand end of the machine shown in Figures 13 and 13A;

Figures 15, 15A constitute a section on line XV—XV, Figures 13 and 13A;

Figure 16 is a side elevation of the central part of the machine looking at the latter from the opposite side to that shown in Figure 12;

Figure 17 is a longitudinal diagrammatical vertical sectional elevation on line XVII—XVII, Figures 13 and 13A, the section being taken along the crest of one of the lower pre-forming guide plates of the machine;

Figure 18 is a diagrammatic view similar to Figure 17 but the section is taken in this case along the base, on line XVIII—XVIII, Figures 13 and 13A of one of the lower guide plates of the machine;

Figure 19 is an enlarged part sectional plan on the line XIX—XIX of Figures 15 and 15A and shows some of the preforming and feed wheels of the machine;

Figure 20 is a section on line XX—XX, Figure 15;

Figure 21 is a section on line XXI—XXI, Figure 15;

Figure 22 is a section on line XXII—XXII, Figure 15A;

Figure 23 is a section on line XXIII—XXIII, Figure 27;

Figure 24 is a section on line XXIV—XXIV, Figure 15A;

Figures 25 and 26 respectively show in perspective and in exploded condition one of the upper and one of the lower guide plates of the machine;

Figure 27 is a plan view showing the mechanism for adjusting the said lower pre-forming guide plates with respect to one another;

Figure 28 shows in perspective a fragment of the feed end of the machine shown in Figures 12, 13, 13A, 15, 15A and 16 in particular;

Figure 29 is a sectional plan on the line XXIX—XXIX of Figure 28 showing a detail of the feed end of the machine;

Figure 30 shows in plan the delivery rollers at the rear end of the machine;

Figure 31 is a section on the line XXXI—XXXI of Figure 15A;

Figure 32 diagrammatically illustrates the transmission of the drive to the various rotating parts of the machine;

Figure 33 diagrammatically illustrates the hydraulic circuit of the machine;

Figure 34 illustrates the form assumed by a sheet when starting on its movement through the machine for pre-forming;

Figure 35 illustrates the same sheet as Figure 34 in a partially pre-formed condition;

Figure 36 diagrammatically illustrates the preformed sheet leaving the delivery end of the machine;

Figure 37 illustrates the pre-formed sheet after entirely leaving the delivery end of the machine and showing how, if left to itself, the sheet expands laterally to approximately the form shown in Figure 4 of the drawings;

Figure 38 illustrates in part sectional plan one of the platens or moulds of the press illustrated in Figure 9; and Figure 39 illustrates in perspective a modification of the delivery end of the machine shown in Figures 30 and 31.

*The corrugated laminates and the method of manufacturing them*

Figure 1:
Figure 1 is a perspective view of a corrugated plastic laminate constructed in accordance with this invention.

Referring to the drawings it will be seen that Figure 1 illustrates a finished corrugated plastic laminate 1 constructed in accordance with this invention; in its finished form the laminate conveniently is 8 feet long by 4 feet wide, and the corrugations of the laminate extend in the longer direction of the laminate and from end to end thereof. The laminate is preferably made between $\tfrac{1}{16}$ and $\tfrac{1}{8}$ of an inch thick. A fragment of the finished corrugated laminate is illustrated in Figure 2 on an enlarged scale.

Figure 2:
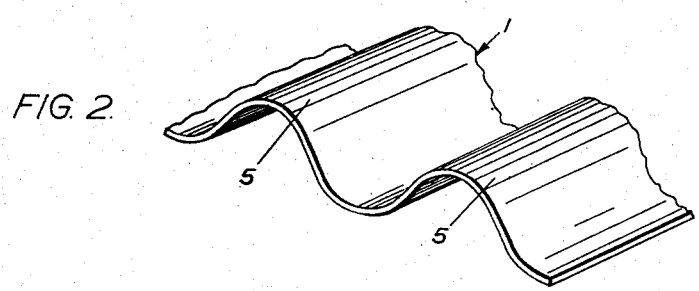
Figure 2 is an enlarged perspective view of a fragment of the laminate shown in Figure 1.
Figure 3:
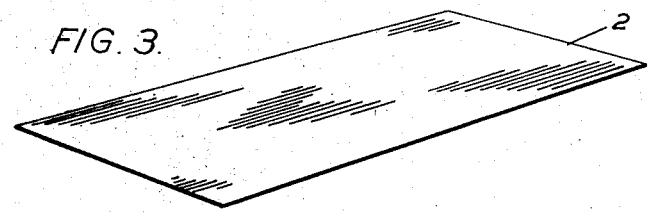
Figure 3 shows in perspective one of the original sheets of paper contributing to the manufacture of the laminate shown in Figure 1.

The laminate 1, shown in Figures 1 and 2, is formed from a plurality of oblong sheets of paper 2, see Figure 3, preferably kraft paper, which has been impregnated with uncured thermo-setting resin (which is preferably of one of the kinds hereinafter mentioned, e. g. a phenol formaldehyde resin) in a water or spirit solution, and dried. Assuming that the corrugations in the finished laminate or 8 feet by 4 feet are to have an amplitude of 1/4 of an inch and a pitch from crest to crest of about 3 inches, then the sheets 2 are initially preferably approximately 5 feet wide and 8 feet 4 inches long.

Figure 5:
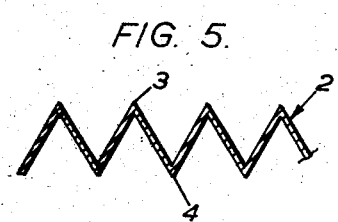
Figure 5 is a cross section on line V—V, Figure 4.

In manufacturing the corrugated laminate of Figures 1 and 2, each of the constituent sheets 2 is pre-formed to the longitudinally preliminarily corrugated or pleated form shown approximately in Figure 4, the corrugations of this pre-formed sheet being of a uniform substantially plane-sided V-shape in cross section as is more clearly seen in the enlarged fragmentary cross section shown in Figure 5; the distance between any crest 3 of any corrugation of this pre-formed sheet and the next base 4 of a corrugation of the sheet is, when measured at right angles to the length of the crests and bases of the corrugations and along the surface of the sheet, substantially equal to half the distance (measured along the surface of the sheet in a similar manner) between the longitudinal centre lines of successive crests 5, 5 (Figure 2) of the finished laminate 1.

The sheet may be pre-formed either manually or mechanically but since it is desired to manufacture laminates economically on a commercial scale, the latter method is preferably adopted and carried out by means of a machine forming part of this invention and hereinafter described.

By this mechanical method of pre-forming the sheet to a corrugated form, the sheet 2 is fed longitudinally endwise, as diagrammatically illustrated in Figure 6, between a series of upper horizontally arranged guide plates 6 and a co-operating series of lower horizontally arranged guide plates 7, each of the said guide plates being of substantially uniplanar form at the feed or front end thereof to which the sheet 2 first passes and then gradually assuming, from the said uniplanar portion to the discharge end thereof, a V-shaped cross sectional form and increasing in amplitude whilst simultaneously decreasing in width or pitch, the V-shaped cross section of each guide plate being of maximum amplitude and minimum pitch at the discharge end of the plate.

The two series of guide plates 6 and 7 alternate with one another and the guide plates 6 nest in the guide plates 7 which are inverted with respect to the plates 6, and the guide plates of the two series are shaped to co-operate with one another so as to pre-form the sheet 2 gradually as it progresses between the guide plates: specimens of the guide plates 6 and 7 are shown in detail in Figures 25 and 26 and will be more fully described later herein.

The crests and bases of the corrugations defined by the guide plates 6 and 7 lie (as seen in plan) along straight lines disposed in laterally spaced vertical planes which all converge from the feed ends of the guide plates substantially uniformly towards the discharge ends of these plates so that, if these vertical planes were all extended beyond the discharge ends of the guide plates, they would converge to a common vertical centre line.

The opposed longitudinal flanks 8 and 9 (Figures 25, 26) of each of the guide plates 6 and 7 progressively twist or curve from their horizontal uniplanar form at their feed ends into positions in which they lie, at the discharge end of the guide plate, at an acute angle to the vertical.

The transition of the said flank surfaces 8 and 9 of the guide plates from the horizontal plane to the said oblique planes is slow enough to suit the sheet being corrugated and to ensure that the latter can be converted from its original uniplanar form to the required pre-formed corrugated form during its passage between the guide plates 6 and 7 without being detrimentally stressed transversely of its direction of feed. The said two series of guide plates are spaced apart just sufficiently to permit the free passage of the fibrous sheet between them.

The feeding of the sheet 2, and the pre-forming of the same, is assisted by feed and pre-forming wheels of which there are two series, one series which operate on the sheet along the lines of the crests to be produced in the sheet, and another series which operate on the sheet along the lines to be followed by the bases of the corrugations to be formed in the sheet. The first-mentioned series of feed and pre-forming wheels comprise a plurality of rows of pairs of wheels 10, 11; 10', 11'; and 10", 11" whilst the other series of wheels comprise a plurality of rows of pairs of wheels 12, 13, and 12', 13'. The two wheels of each of the said pairs are respectively adapted to engage the sheet 2 on opposite sides thereof, the wheels of the 10 and 11 series engaging the sheet where the corrugation crests are to be, or are being, formed and the wheels of the 12 and 13 series engaging the sheet where the corrugation bases are to be, or are being, formed.

All the wheels of the 10 and 11 series are arranged in vertical planes passing through the corrugation crests defined by the guide plates 6 and 7 whilst all the wheels of the 12 and 13 series are arranged in vertical planes passing through the bases of the corrugations defined by the guide plates. The rows of pairs of wheels of the 10 and 11 series (e. g. rows of wheels 10, 11; 10', 11'; and 10", 11") are arranged across the guide plates 6 and 7, and similarly the rows of the wheels of the 12 and 13 series, e. g. the row of wheels 12, 13; and the row of wheels 12', 13'; also extend across the guide plates as diagrammatically illustrated in Figure 6 and as will be more particularly described hereinafter.

All the wheels 12, 12' are arranged with their axes of rotation in a common horizontal plane parallel to the uniplanar ends of the guide plates 6 and 7 and the wheels 13, 13' have their axes parallel to those of the wheels 12. On the other hand the axes of the wheels 10, 10' and 10" are arranged in horizontal planes but these axes are successively at greater distances from the plane containing the axes of the wheels 13, 13', this divergence taking place from the feed to the discharge ends of the guide plates 6 and 7 in accordance with the desired progressive increase in the amplitude of the corrugations to be produced in the sheet 2. The axes of the wheels 11, 11' and 11" are respectively parallel to the axes of the wheels 10, 10' and 10". Thus the co-operating sheet-gripping portions of the peripheries of the pairs of wheels 10, 11; 10', 11'; and 10", 11" are progressively spaced to an increasing extent from the horizontal plane containing the feed ends of the lower guide plates 7, said progressive spacing being in a divergent path corresponding with the form of the crests of the guide plates. Thus as the sheet 2 is fed end-on longitudinally between the guide plates 6 and 7, it is simultaneously displaced, to a progressively increasing extent, transversely or perpendicularly out of its original plane, this progressive displacement being effected along laterally spaced convergent straight (as seen in plan) lines extending longitudinally of the sheet at predetermined positions corresponding to the crests of the corrugations to be formed in the sheet whilst simultaneously the material of the sheet is drawn inwardly in the direction of the arrows A and B to compensate for the progressively increasing displacement of the sheet transversely from its original plane, thereby avoiding harmful stressing of the sheet in the direction of its width as a result of its said transverse displacement.

After being pre-formed as above described, the sheet is creased firmly along the centre lines of the crests and bases of all the corrugations therein so as to impart to the sheet along these portions thereof an enduring set whereby the natural tendency of the pre-formed sheet to resume its originally flat or substantially flat form will be restrained and the sheet will maintain a sufficiently pre-corrugated form to enable it to be satisfactorily used in the production of the corrugated laminates without there being any serious danger of the sheets being fractured during the consolidation of the laminate.

The creasing of the sheet along the said crests and corrugations is preferably effected mechanically by passing the crests and bases of the corrugations of the sheet between nipping wheels as is diagrammatically illustrated, for one corrugation base, in Figure 7 of the accompanying drawings From this figure it will be seen how each base 4 (or crest 3) is passed between a pair of nipping wheels 14' and 15' (or 14 and 15) which are urged together (as hereinafter described) by spring means so that the marginal portions 16 and 17 of the sides of the corrugation immediately adjacent the base (or crest) of the corrugation will be pressed together to form a sharp crease, the corrugation of the sheet being internally supported, as shown, by a supporting wheel or disc 18 or 18' at a distance from the base (or crest) to be creased.

As the nipping wheels 14' and 15' and supporting wheel or disc 18' form one set of a number of similar sets hereinafter described in detail in connection with the machine for mechanically pre-forming the sheets 2, these parts will not be further described at this stage.

When a sheet 2 has been pre-formed as above described, it is preferably placed on a restraining and supporting device which holds it ready for use and assists the said creases in restraining the sheet, when other sheets are superposed thereon, against expansion in its own plane and transversely to the lengths of the corrugations in the sheet.

Figure 8:
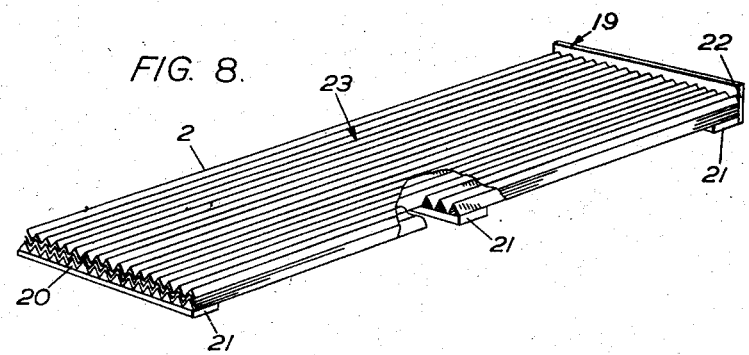
Figure 8 illustrates in perspective a rack for supporting the pre-formed sheets prior to their use in the manufacture of a corrugated plastic laminate.

The said supporting and restraining device conveniently comprises a rack 19, illustrated in Figure 8, which comprises a plurality of parallel adjacent bars 20 of isosceles triangular shape in cross section and carried upon a plurality of cross battens 21, the rack thus having a corrugated transverse cross sectional form. The dimensions of the bars 20 are so chosen as to agree with those of the pre-corrugated sheets which the rack is to support.

At one end the rack 19 is furnished with a sheet-registering strip 22 against which one end of each sheet placed on the rack may be engaged so that superposed sheets can be registered with on another on the rack.

As the sheets 2 are pre-corrugated they are placed one after the other on the rack 19 until an assembly 23 of sheets has been collected on the rack sufficient to produce a corrugated laminate of the required thickness. The laminate assembly 23 thus formed is then transferred into a press and placed between a pair of adjacent heated platens or moulds thereof. Preferably a hydraulic press having a plurality of daylights is employed so that a plurality of laminates may be made at each pressing operation as hereinafter described. Figure 9 shows four platens A, B, C and D of a three-daylight hydraulic press.

The opposed surfaces 24 and 25 (Figures 9 and 11) of each pair of platens are oppositely longitudinally corrugated (male and female fashion) to the form of the corrugations required in the finished laminate 1 and one or more of the pre-formed laminate assemblies 23 is or are inserted between the said opposed surfaces 24 and 25 of each pair of platens with the corrugations of the latter registering with those of the pre-formed laminate assembly or assemblies 23 and, subsequently, the platens (which constitute moulds) are closed and the heat thereof is thus applied to the superposed sheets of paper in each laminate assembly 23 while these sheets are simultaneously compressed: thus the resin in the sheets is caused to flow and eventually the sheets are consolidated into a laminate and the resin thereof is cured; the press platens are then separated and the finished laminate 1 removed therefrom and trimmed along its longitudinal and end edges.

The platens may be heated in any suitable manner as, for example, by steam or electrically, but a preferred form of the platens will subsequently be described herein.

Figure 11:
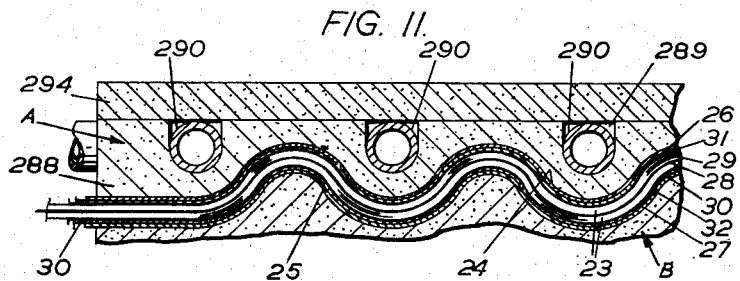
Figure 11 illustrates in their closed condition two of the platens shown open in Figure 10.
Figure 10:
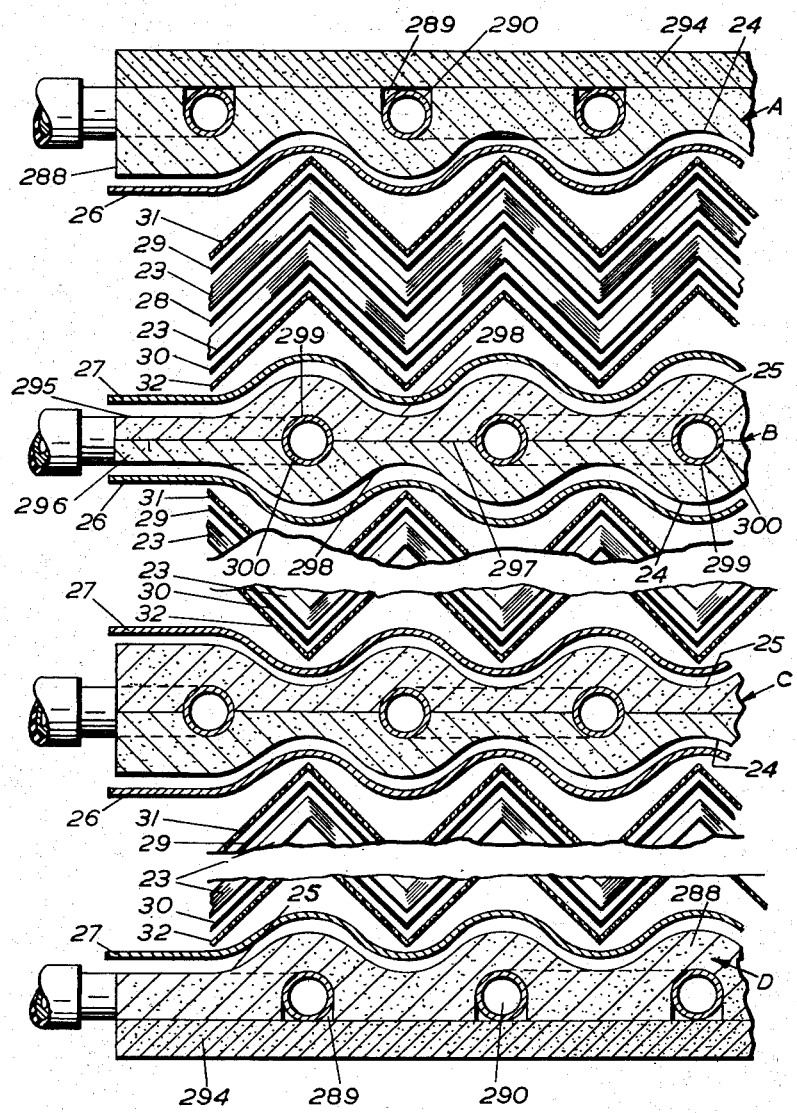
Figure 10 illustrates diagrammatically, in vertical section, the arrangement of laminate assemblies between the platens of a press ready for heating and pressing to produce corrugated plastic laminates.

Figures 10 and 11 illustrate the production of several laminates in each daylight of the press as will hereinafter be described, Figure 11 showing the top two platens of the press fully closed and the laminate assemblies located between these two platens (as shown in Figure 10) moulded to their final forms.

As stated above, the opposed surfaces 24 and 25 of each pair of platens between which the laminate or series of laminates are to be moulded will be longitudinally corrugated so that the corrugations in the said opposed surfaces will be in the nature of male and female corrugations; however, appropriate allowances should be made in the dimensions of the corrugations of the two platens so as to compensate for the intervening thickness of material to be compressed between them; thus where, for example, several laminates are to be produced between each pair of platens as described in detail subsequently with reference to Figure 10, it will be understood that a very slight variation will be present between the curvatures and dimensions of the corrugations of the several laminates so simultaneously formed, this being due to their different spacings from the corrugated surfaces of the platens and consequently the increasing radii of curvature of their various parts. Appropriate notice of these matters must be taken when shaping the moulding surfaces of the platens.

If instead of using one or more laminate assemblies 23 in which the individual sheets were pre-formed as aforesaid, one or more assemblies of superposed flat (not pre-formed) sheets were placed between a pair of corrugated moulds or platens such as, for example, the platens A and B, then as these platens were closed and the sheets of paper were initially displaced transversely upwardly and downwardly from their original planes to form corrugations therein, there would be a simultaneous lateral inward movement of the outer longitudinal parts of the sheets to compensate for the said transverse displacement of the sheets; however, at an early stage in the closing of the platens the superposed sheets of paper would be gripped longitudinally at transversely spaced intervals between the platens so that the further inward drawing of the sheets would be resisted and eventually altogether arrested and this would take place before the complete moulding operation had been effected. This has been proved in tests from which it has been found that the continued closing of the platens after the lateral inward drawing of the sheets has been impeded, will result in the fracturing of the product longitudinally thereof during its manufacture and that this fracturing is aggravated as the thickness of each laminate, and also as the number of laminates produced simultaneously between each pair of platens, is increased.

However, it has been found that, by pre-forming the fibrous sheets and building up pre-formed laminate assemblies 23 as above described and by using these pre-formed corrugated laminate assemblies instead of flat laminate assemblies, the aforementioned disadvantages are substantially completely eradicated so that it is now practical to produce corrugated plastic laminates without fracture during moulding and, moreover, that it is also practical by this method to produce simultaneously a plurality of corrugated laminates in each daylight of the press.

Each laminate assembly or each group of superposed laminate assemblies may, before being placed between a pair of platens in the press, be located between a pair of cover plates 26 and 27 (Figure 10) which may be made of any suitable metal for example, block steel, mild steel, or non-ferrous metals or alloys thereof, each plate being corrugated to match the corrugations of the platen adjacent to which it will be located when in the press.

*Moulding a plurality of corrugated laminates with decorative surfaces*

To facilitate the simultaneous manufacture of a plurality of laminates in each daylight of the press, a plurality of laminate assemblies are stacked one upon the other with a flexible or limp separating layer 28 between each successive laminate assembly, the separating layer preferably being placed in position as the pre-formed fibrous sheets are assembled on the rack 19 so as automatically to be caused to conform approximately to the corrugated character of these pre-formed sheets during the assembly of the sheets on the rack. Alternatively, the separating layers 28 may themselves be pre-corrugated ready for use.

The said separating layers are formed of a material which is waterproof and impermeable to the thermo-setting resin so that the separating layers do not adhere to the adjoining laminates produced during the moulding operation, but can be readily stripped therefrom when the laminates are taken from the press.

Conveniently the said flexible or limp separating layers comprise a moisture proof thermo-setting resin-impermeable flexible sheet or film material such as, for example, the moisture-proof cellulosic material sold under the registered trade-marks "Cellophane" and "Rayophane," such material preferably being of between 0.003 and 0.010 of an inch thick. U. S. Patents Nos. 1,737,187, 1,826,696 and 1,826,699 describe methods of preparing moisture proof cellulose film or sheet materials of this kind and which would be suitable for the present purpose. Alternatively the said flexible or limp separating layers may comprise a metallic foil in sheet form and of between, for example, 0.001 and 0.005 of an inch thick. The metallic foil may be made, for instance, of copper, aluminium or its alloys, zinc, or tin foil. In a still further alternative, the flexible separating layer or layers may be formed by thin thermoplastic sheeting having, at least during the pressing and heating operation, the said properties of flexibility or limpness and impermeability to the thermosetting resin employed in the laminate assemblies and sufficient cohesive properties to maintain its separating characteristics. Thus the flexible separating layer or layers may be formed of unplasticised polyvinyl chloride.

If desired, a separating layer 29, similar to the separating layers 28 may be interposed between the cover plate 26 and the next adjacent laminate assembly in the press so as to separate this assembly from the cover plate and thereby avoid the necessity for lubricating the latter in any way. A similar separating layer 30 may be interposed between the lower cover plate 27 and the adjacent laminate assembly for like purposes.

Where the texture or form of the fibrous sheets 2 is suitable, it will be found that during moulding of the laminate assemblies to the corrugated laminate form, the adjacent or successive laminate assemblies will act upon one another through the said flexible or limp separating layers as mutual surface-configurating moulds; thus the surfaces of the laminates will be furnished with a decorative finish and where the paper used is kraft paper, the laminate assemblies will co-act with one another to produce on the surfaces of the finished laminates a configuration of the kind hereinbefore referred to as a "hammered" finish.

So that the upper surface of the upper laminate assembly, and the lower surface of the lower laminate assembly, in the press may also have the decorative or hammered finish above referred to, one or more sheets 31 (see Figure 10) of the same paper, e. g. kraft paper, as that used for the production of the laminates may be interposed between the cover plate 26 and the separating layer 29, whilst a similar sheet or group of sheets 32 may be interposed between the cover plate 27 and the separating layer 30 at the bottom of the group of laminate assemblies, these interposed sheets 31 and 32 preferably being unimpregnated with the resin and respectively acting as moulding elements or cushions for the upper and lower surfaces of the top and bottom laminates moulded between a pair of adjacent platens.

*Machine for pre-forming the fibrous sheets for use in the manufacture of the corrugated laminates*

Referring to Figures 12 to 33 (particularly Figures 12, 13, 13A, 15, 15A and 16), it will be seen that the machine there illustrated comprises a bed frame 33 disposed in a horizontal plane and supported by a plurality of pillars 34. To each of the pillars 34 at the four corners of the machine there is fixed a vertical hydraulic cylinder, these cylinders being seen in Figures 13, 13A, 16 and 33 and being respectively marked 35, 36, 37 and 38. In each of these cylinders is an axially slidable vertical ram, these rams being respectively marked 39, 40, 41 and 42. At their upper ends the said rams are fixed respectively to the four corners of a horizontal head frame 43 of the machine which can be raised and lowered hydraulically with respect to the horizontal frame 33. The upper side of the head frame 43 is enclosed in a hood 44 furnished with transparent windows 45 through which the interior of the head frame 43 can be inspected from the exterior of the machine. As will subsequently be described, the raising and lowering of the head frame 43 is controlled by a plurality of valves and the arrangement is such as to ensure that the head will be adjusted upwardly and downwardly at an equal rate at each corner thereof in spite of the unequal loading that there is on the head due to the somewhat uneven distribution of the various mechanism thereon.

Across the bed frame 33 which, as seen in plan, converges from the feed end (the left-hand end in Figure 13) to the discharge end (the right-hand end in Figure 13A), are arranged a series of rigid arcuate carrier plates respectively marked 46, 47 and 48 (see Figures 13, 13A and 15, 15A and 16). A similar set of rigid arcuate plates 49, 50 and 51 extend across the underside of the head frame 43 opposite to the corresponding plates 46, 47 and 48 on the bed frame 33.

In addition three straight girders respectively marked 52, 53 and 54 extend in parallelism across the bed frame 33 whilst three similar girders 55, 56 and 57 are fixed to and extend across the underside of the head frame 43.

On their upper sides the girders 52 and 53 on the bed frame 33 respectively carry rigid arcuate plates 58 and 59 extending completely across the machine (as clearly seen in Figures 13, 13A) and similarly the girders 55 and 56 of the head frame 43 carry on their lower sides rigid horizontal arcuate plates respectively marked 60 and 61, the plate 60 being similar to the plate 58 and the plate 61 being similar to the plate 59 above referred to.

*Guide plates*

The plates 58 and 59 support a series of lower guide plates 7, one of which is shown in detail in Figure 26 (as well as being shown in Figures 6, 17 and elsewhere). Along its length the guide plate 7 has a series of four transverse blocks respectively marked 62, 63, 64 and 65 affixed thereto, these blocks being similar to the blocks 95, 96, 97 and 98 shown in Figure 25 which illustrates one of the upper guide plates 6 to which further reference will subsequently be made. The guide plates 7 are each pivoted upon a screw-threaded stud 66 (Figure 17) passing upwardly through a hole 67 (Figures 13 and 17) in the front edge of the arcuate plate 58 extending across the bed frame 33 of the machine, there being a series of the holes 67, one hole 67 for each guide plate 7, at spaced intervals along substantially the whole length of the plate 58. The upper end of the stud 66 screws into the underside of the block 62 of the guide plate 7, this block being spaced some short distance from the front or feed end of the plate which is downturned at this end as shown at 68 (Figure 26) to provide a flared entrance for the sheet to the guide plates.

The transverse block 63 of each guide plate 7 rests upon the front part of the arcuate plate 58 and a stud 69 which is screwed centrally into this block has its shank passing through an arcuate slot 70 provided in the rear edge of the plate 58, there being one of these slots (see Figure 13) for each of the guide plates 7. Similarly the block 64 of the guide plate 7 rests on the arcuate plate 59 which is, along its rear edge, provided with arcuate slots 71 (Figures 17 and 13A), one for each guide plate 7, through each of which passes a stud 72 screwed into the under side of a block 64 of a guide plate 7.

The rearmost block 65 of each guide plate 7 rests upon the upper side of one or the other of a pair of similar cam plates 73 and 74 (Figures 13A, 17 and 27) arranged horizontally across the machine and having their inner ends pivotally mounted upon a central pivot post 75 carried upon the cross girder 54 on the bed frame 33, each of the cam plates 73 being capable of being swung about its pivot post 75 and locked in any of its adjusted positions by means of a locking screw 76 (Figures 13A and 27) passing through an arcuate slot 77 (whose centre of curvature is at the pivot 75) and screwing into the bed frame 33 of the machine or a part thereon. Moreover each cam plate 73, 73 has a series of other arcuate transverse cam slots 78, there being one such slot for each guide plate 7, and the block 65 of each of the latter is furnished with a stud 79 which passes through the corresponding arcuate slot 78 in the cam plate 73 or 74 as shown in Figures 17 and 27, for example.

The cam slots 78 are so shaped and orientated with respect to one another that all the guide plates 7 controlled by these plates will, when the cam plates are adjusted about their pivots 75, be adjusted a proportionate amount towards or away from the central longitudinal medial plane of the machine to increase or decrease the pitch of the corrugations to be formed in the preformed sheet of paper to be passed through the machine, it being understood that when adjusted this pitch must be maintained uniform for all the corrugations across the whole width of the sheet. The arcuate slots 79 and 71 in the plates 58 and 59 are made long enough to permit the said adjustment of the guide plates.

As will be seen particularly from Figures 13 and 13A, a plurality of the guide plates 7 are arranged side by side across the machine, all these guide plates being laterally slightly spaced apart and all converging towards the discharge end of the machine. If continued, their longitudinal centre lines would all converge to a common point in a horizontal plane beyond the discharge end of the machine.

Each guide plate 7 commences at its feed end by being flat or uniplanar and then gradually assumes an inverted V-shaped cross sectional form, the sides or flanks 8 and 9 (Figure 26) of the plate slowly twisting or curving along the guide plate until the final V-shaped cross sectional form is attained at the delivery end 80 of the plate. Thus the height or amplitude of the plate gradually increases from the feed to the delivery end of the plate whilst the transverse dimension or overall width of the plate simultaneously progressively decreases.

Figure 7:
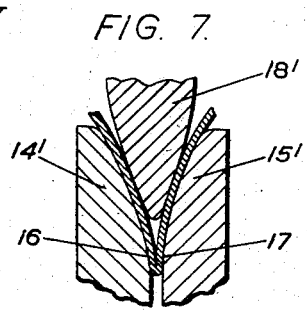
Figure 7 is a view showing diagrammatically the method of creasing the corrugations produced in a pre-formed sheet in order to give these corrugations an enduring set.

The crest 81 of each guide plate 7 follows a straight line in plan but assumes a somewhat curved character in side elevation, as is made clear in Figures 7 and 17, the crest of the guide plate being reinforced with a wearing strip conveniently made up in three sections 82, 83 and 84 and secured to the guide plate by screwed shanks 85 which pass through holes 86 in the guide plate, the wearing pieces being held in position by packing pieces 87 on the inside of the guide plate and nuts 88 screwing on to the shanks 85.

Thus the wearing strips 82, 83, 84 can be given the precise form necessary to follow the progressively changing form to be imparted to the crests of the corrugations of the sheet of paper as it passes through the machine, the ridges or crests along the wearing pieces 82, 83 and 84 being of a somewhat curvilinear character as seen in side elevation. The upper guide plates 6 are very similar to the lower guide plates 7 and will, therefore, not be described in detail. However the bases, corresponding to the crests of the guide plates 6, are not curvilinear but straight in side elevation. Similarly the ridges of the wearing pieces 82', 83' and 84' on the upper guide plates 6, and corresponding to the wearing pieces 82, 83 and 84 of the plates 7, are of rectilinear form in side elevation and plan throughout their whole lengths.

Figure 6 and the several cross sectional views shown in Figures 20, 21, 22 and 23 show clearly the arrangement of the lower guide plates side by side and indicate the successively increasing V-shaped character of these plates. These figures also show the alternate superposed nesting arrangement of the upper guide plates 6 with respect to the lower guide plates 7, the guide plates 6 being very similar to the lower guide plates 7, as will be seen from Figures 25 and 26, but being inverted with respect to the plates 7 and supported upon the underside of the head frame 43 in a manner similar to that in which the guide plates 7 are carried on the bed frame 33.

Thus, as will be seen from an inspection of Figures 15, 15A and 18, for example, each of the upper guide plates 6 is pivoted by a stud 89 to the arcuate plate 60 carried by the girder 55 on the head frame 43 whilst the guide plate is supported along its length by a stud 90 passing through an arcuate slot (similar to the slot 70 previously described) in the rear edge of the plate 60, and by a stud 91 passing through an arcuate slot in the rear edge of the plate 61 carried by the girder 56 on the head 43, this arcuate slot being similar to the arcuate slot 71 previously described for a lower guide plate. Finally the discharge or rear ends of each of the upper guide plates 6 is connected, as in the case of each lower guide plate 7, by a stud 92 to one or the other of a pair of upper pivoted cam plates 93 and 94 corresponding to the cam plates 73 and 74 previously described and which may be operable in unison with or independently of (as shown) the latter cam plates. The studs 89, 90, 91 and 92 are respectively carried by the transverse blocks 95, 96, 97 and 98 rigidly fixed to the guide plates 6 on the upper side thereof and very similar to the blocks 62, 63, 64 and 65 previously referred to in connection with the lower guide plates 7.

It will be understood that the guide plates 6 are set between the guide plates 7, as is clearly indicated in Figures 6, 21, 22 and 23, so that, when the head frame 43 is lowered to bring the guide plates 6 into their closest proximity to the guide plates 7, the two series, i. e. the upper and the lower series, of guide plates define between them a transversely corrugated gap, the two series of guide plates 6 and 7 acting as two nesting longitudinally slotted convergingly corrugated plates, the crests and bases of the corrugations of which lie, when seen in plan, along straight lines disposed in laterally spaced vertical planes which all converge from the feed ends of the plates uniformly towards the discharge ends of the plates, the corrugations in each guide plate progressively taking form and increasing in amplitude, whilst simultaneously decreasing in pitch, from near the feed ends of the plates towards the discharge ends thereof.

It will be noticed from Figures 6, 21, 22 and 23 that longitudinal slots 99 are left between the longitudinal edges of the upper guide plates 6 whilst similar longitudinal slots 100 are left between the longitudinal edges of the adjacent lower guide plates 7. It will be understood that the slots 99 all converge with respect to one another in a direction towards the discharge end of the machine and that the slots 100 similarly converge with respect to one another.

Feed and pre-forming wheels

The sheet 2 is fed endwise longitudinally between the relatively flat feed ends of the upper and lower guide plates 6 and 7 and, shortly after entering between these plates, the feed of the sheet is taken up by the first row of feed and pre-forming wheels 10, 11 of the first series of such wheels which act along the crests of the sheet 2 as it is pre-formed. The wheels 10, 11 pass the sheet on endwise to a second row of such wheels 10', 11' which in turn pass the sheet to a third row 10", 11" of these wheels, there being three rows of these wheels arranged at spaced intervals along the machine; all these wheels act on the sheet simultaneously during part of the movement of the sheet through the machine. However, as the sheet first advances into the guide plates 6 and 7 one row of the said wheels only act upon it, then the second row begin to act on it together with the first row and finally the third row take up the sheet after which the trailing end of the sheet leaves the first row of wheels and subsequently the second row and finally the third row.

The said rows of feed and pre-forming wheels are diagrammatically illustrated in Figure 6 and have already been referred to. The feed wheels of each row are arranged in an arc across the machine, each wheel rotating in the vertical plane containing the centre line of one of the slots 99 between the adjacent guide plates 6, 6. In the first row of pre-forming and feed wheels at the left-hand end of the machine (as this is seen in Figures 15, 15A) there is, as will be seen from Figure 20, one upper feed wheel 10 and one lower feed wheel 11 for each slot 99 between adjacent upper guide plates 6, these slots coinciding with the lines along which the crests are to be formed in the corrugated sheet to be produced.

The wheels 10 and 11 of each pair are arranged in the same vertical plane and the upper wheel has a peripheral groove 101 of very shallow V-section whilst the wheel 11 has a doubly-bevelled periphery 102, the ridge 103 of which periphery registers with the bottom of the groove 101 in the wheel 10 and the arrangement is that the wheels 10 and 11 are adapted lightly to grip the sheet of paper 2 between them and advance it as well as displace it out of its original plane as the sheet passes through the machine.

In order that the wheels 11 (and also the wheels 11' and 11") may have access to the paper 2, the lower guide plates 7 are each furnished with longitudinal central slots 104 through which the corresponding wheel may pass. The edges of the upper guide plates 6 are also recessed at 117 (Figure 25) to give the wheels 10, 10', and 10" access to the sheet 2.

The wheels 10 and 11 of each pair are both of the same effective diameter. That is to say, the peripheries of the two wheels which engage the paper are of the same diameter and this diameter is maintained for all the feed and pre-forming wheels throughout the machine so that the same linear rate of feed is maintained when the wheels are all rotating, as they do, at the same speed.

Preferably the wheels 10 and 11 (and all similar wheels) are formed of a rigid non-metallic material, e. g. fibre or a laminated synthetic resin material, and particularly linen or like fabric-based laminated material, and both wheels of each pair are positively driven.

All the wheels 10 across the machine are mounted upon a splined driving shaft 105 which is built up of a plurality of straight sections (each carrying one of the wheels 10) arranged end-to-end across the machine in an arcuate or forwardly bowed arrangement as shown clearly in Figures 13, 13A, and 32. Figure 19 shows, on a larger scale, a similar arrangement for the second row of feed wheels 10', 11' of the machine. The adjacent ends of successive sections of the shaft 105 are united by universal joints and supported in bearings in brackets 106 arranged across the machine and depending from the arcuate cross plate 49 previously referred to, there being one bracket 106 for each shaft junction as well as one at each end of the shaft.

The lower wheels 11 co-operating with the wheels 10 are mounted on a splined shaft 107 also extending arcuately across the machine precisely as the shaft 105, the shaft 107 being composed of a plurality of end-to-end splined sections having its successive sections united by universal joints and mounted in bearings in upstanding brackets 108 (Figure 20) carried by the arcuate plate 46 extending across the bed frame 33 of the machine.

As the guide plates 6 and 7 are adjustable towards and away from one another at their delivery ends, the guide plates being pivotal about their pivot pins 66 and 89 respectively, it is necessary that the feed wheels 10 and 11 of each pair should be movable with the upper and lower guide plates 6 and 7 respectively transversely of the machine and, for this purpose, the wheels 10 and 11 are splined upon their shafts 105 and 107 so as to rotate therewith whilst being axially adjustable along these shafts. To effect the adjustment of the wheels 10 simultaneously with the upper guide plates 6, each wheel 10 is furnished with a metal boss 109 (see Figure 20 for example) having a peripheral groove 110 in which engages the forked end 111 of a bracket 112 fixed to the adjacent guide plate 6. One of the brackets 112 is seen very clearly in Figure 25 at the right-hand end of the same.

Thus, when the upper guide plates 6 are pivoted in a horizontal plane either to the left or to the right, the feed wheels 10 make a corresponding movement along their shaft sections.

The co-operating lower feed wheels 11 are also splined upon their shaft 107 and adjustable axially therealong with the lower guide plates 7, the wheels 11 each having a boss 113 similar to the boss 109 of the wheels 10, and this boss being furnished with a groove 114 in which engages the forked end 115 (Figures 15 and 20) of a bracket 116 carried on the adjacent lower guide plate 7. The brackets 116 are similar to the brackets 123 hereinafter described.

As the paper passes between the feed wheels 10 and 11 of the first row, it is displaced (as is clearly illustrated in Figure 20) out of its own plane along alternate straight convergent (in plan) lines, the paper between each pair of successive crests thereacross extending from the periphery of one of the feed wheels 11 (see the centre wheel 11 in Figure 20) obliquely downwardly under the wearing piece 82' and then upwardly and over the periphery of the next wheel 11 so that the paper engages the feed plates mainly only on convergent longitudinal lines whereby the frictional engagement of the strip with the guide plates 6 and 7 is reduced to a minimum.

The second row of feed and pre-forming wheels of the same series of wheels as the row 10 and 11 and which act on the crests of the paper being pre-formed, is located approximately centrally of the machine, as will be seen from Figures 15 and 15A. The wheels of this second row are marked 10', 11' as previously explained and are substantially identical with the row of wheels 10 and 11 above described with particular reference to Figure 20, this second row of guide wheels 10', 11' engaging along the same crests of the sheet of paper 2 as the corresponding wheels 10 and 11 of the first row. The only difference between the wheels of the second row and those of the first row is that the V-shaped peripheral grooves 101' of the wheels 10' of the second row are somewhat deeper than the grooves 101 of the first row of wheels 10 as can easily be seen from Figure 19 which shows this second row of wheels.

The wheels 10' and 11' are respectively mounted on splined sectional shafts 105' and 107' (Figure 19) which are in all respects similar to the shafts 105 and 107 previously described. Similarly these shafts 105' and 107' are mounted in bearings in brackets 106' and 108' respectively. The brackets 106' and 108' are supported respectively from the cross plate 50 of the head frame 43 and the cross plate 47 of the bed frame 33 of the machine. Likewise the wheels 10' are adjustable along their shaft sections 105' from the guide plates 6 through the medium of brackets 112' (see Figures 19 and 25) carried by the guide plates 6 whilst the wheels 11' are adjustable on their shaft 107' by brackets 116' carried by the guide plates 7, as shown in Figure 15.

Adjacent, and in front of, the second row of feed wheels 10', 11' is the first row of the feed and pre-forming wheels of the second series of such wheels, the wheels 12 and 13 of this series acting along the bases of the corrugations formed in the sheet 2 as it passes through the machine. There is one wheel 12 and one wheel 13 for each corrugation base of the sheet being formed, and these wheels are arranged vertically one above the other in a common plane, as is clearly seen from Figure 21. The wheels 12 and 13 are respectively of the same form as the wheels 10 and 11 previously described, the lower wheel 13 in this case being peripherally grooved and the upper wheel 12 being peripherally doubly bevelled to co-operate with the wheel 12. The grooved wheel is lowermost and the bevelled wheel uppermost since the groove of the wheel 13 is to receive the under-surface of the base of the adjacent corrugation of the sheet 2 passing through the machine.

The wheels 12 and 13 are respectively carried by arcuate shafts 119 and 118 (Figures 15 and 21) each of these shafts being, like the shafts 105, 107, and 105' and 107' previously described, formed in a plurality of end-to-end straight splined sections having the adjacent ends connected by universal joints and supported in bearing brackets, the shaft 118 being supported in bearing brackets 120 projecting up from the plate 47 on the bed frame 33 of the machine whilst the shaft 119 is carried by brackets 121 depending from the cross plate 50 on the head frame 43.

The feed wheels 12 and 13 are, like the feed wheels 10, 11 and 10', 11', adjustable along their shafts with the guide plates 6 and 7 respectively, this adjustment being effected in the case of the wheels 13 by dependent forked brackets 122 (Figures 15 and 19) on the lower guide plates 7 and engaging the grooved bosses of the wheels 13, whilst the upper wheels 12 are adjusted along their shaft sections through the medium of brackets 123 (Figures 15, 19 and 21) of the form shown more clearly in Figure 25. The wheels 12 and 13 thus act upon the bases of the corrugations being formed in the sheet 2 in a very similar manner to that in which the wheels 10, 11 and 10', 11' act upon the crests being formed in the sheet.

To give the wheels 12 and 13 clear access to the sheet 2, the upper guide plates 6 are furnished with central longitudinal slots 104' (similar to the slots 104 of the lower guide plates 7) through which the peripheries of the wheels 12 may pass and the longitudinal edges of the lower guide plates 7 are furnished with rectangular notches 117' (similar to the notches 117 in the upper guide plates 6) through which may pass the peripheries of the wheels 13.

By reason of the sheet bearing primarily on the wearing strips along the bases of the upper guide plates 6 and the crests of the lower guide plates 7, the sheet is sufficiently free to enable it to be drawn inwardly in a lateral direction to compensate for its increasing transverse displacement out of its original plane.

The third row of feed and pre-forming wheels of the first series and the second row of wheels of the second series are shown at 124 (Figure 15A) and also diagrammatically in transverse cross section in Figure 22, these rows of wheels being similar to the central rows of wheels 10', 11' and 12, 13 of the machine: that is to say, the second row of wheels 12', 13' of the second series of wheels are similar to the wheels 12 and 13 of the first row of this series, whilst the wheels 10''' and 11''' of the third row of the first series of wheels are respectively similar to the wheels 10' and 11' of the second row of this series, the only differences being that the wheels 13'' and the wheels 10''' have deeper peripheral grooves than the corresponding wheels 13 and 10'. The wheels 10''' and 11''' are respectively arranged on shafts 105''' and 107''' similar to the shafts 105 and 107 and are adjusted similarly to the wheels 10 and 11 along their shafts. Similarly the wheels 12' and 13' are arranged on shafts 119' and 118' respectively and these shafts are similar to the shafts 119 and 118 whilst the wheels 12' and 13' are adjustable along their shafts in a manner similar to that in which the wheels 12 and 13 are adjustable on their shafts.

It will, of course, be appreciated that the axes of the shafts 118 and 118' of the wheels 13 and 13'' are in the same horizontal plane whilst the axes 119 and 119' of the upper wheels 12 and 12' are also in the same horizontal plane as one another so that these wheels 12, 13 and 12', 13' maintain the portions of the sheet which are to form the bases of the corrugations therein in the same horizontal plane as the uniplanar feed ends of the lower guide plates 7, whilst the portions of the sheet forming the crests of the corrugations are displaced upwardly in planes perpendicular to the original plane of the sheet, this being effected jointly by the guide plates 6 and 7 and the wheels 10, 11; 10', 11'; and 10'', 11''; the axes of the wheels 11, 11' and 11'' being arranged in a surface slightly longitudinally bowed with respect to the plane containing the axes 118 and 118' of the wheels 13 and 13', said bowed surface more or less following the approximately parabolic upward curvature of the ridges of the wearing strips 82, 83 and 84, whilst the axes of the wheels 10, 10' and 10'' are arranged similarly to the axes of the wheels 11, 11' and 11'' with which they co-operate.

Thus as the sheet passes through the machine from the feed end to the discharge end thereof, it is progressively transformed from a planary sheet into a corrugated one having a plurality of uniform corrugations extending throughout its length, these corrugations decreasing in pitch and increasing in amplitude as the sheet passes towards the discharge end of the machine.

*Nipping wheels*

In order that the corrugations of the pre-formed sheet shall be given an enduring set, the machine is furnished, beyond the dischage ends of the guide plates 6 and 7, with a pair of nipping wheels 14, 15 for the crest of each corrugation and with a similar pair of nipping wheels 14', 15' for the base of each corrugation of the sheet, the wheels 14 and 15 being in advance of the wheels 14' and 15' as is clearly seen from Figures 15A and 24.

The nipping wheels 14 and 15 are mounted in pairs on driving shafts extending across the machine. As the corrugations in the pre-formed sheet converge in straight lines towards the discharge end of the machine, it is necessary that the nipping wheels should be arranged across the machine so that the axes of the several pairs of nipping wheels are more or less at right angles to the crests of the corrugations with which the nipping wheels thereon are to deal, whereby the nipping wheels will readily take up the crests of the corrugations in the sheet. Consequently the central group of pairs of nipping wheels 14, 15 are arranged upon a short shaft 127 extending horizontally across the machine centrally thereof and at right angles to the longitudinal medial plane of the machine, this shaft being carried in bearing brackets 128 (Figure 15A) dependent from an upper horizontal cross beam 134 later to be described, whilst one side group of pairs of nipping wheels 14, 15 is arranged upon a horizontal shaft 129 which is set slightly obliquely with respect to the shaft 127 so as to be substantially at right angles to the crests of the corrugated sheet passing to the nipping wheels on this shaft, and the other side group of nipping wheels, 14, 15 is carried by a further oblique shaft 130 similar to the shaft 129 (see Figure 32). The shafts 129 and 130 are suspended from the beam 134 by brackets similar to the brackets 128 already described.

The ends of the shaft 127 are coupled to shaft extensions 131 and 132 by universal joints, these shaft extensions being parallel respectively to the shafts 130 and 129 and being supported in brackets 133 dependent from the upper cross beam 134.

The cross beam 134 is supported at its ends upon the lower ends of adjusting screws 135 (there being one such screw at each end of the beam) passing through brackets 169 and 174 on a skeleton box-like frame 166 (Figures 13A, 15A and 16) fixed to extensions 33'' of the bed frame 33 of the machine, this skeleton frame extending upwardly from the extensions 33' and being quite independent of the head 43 of the machine.

The skeleton frame 166 comprises at one side (see Figure 13A) a pair of parallel spaced uprights 167 and 167' each fixed near its lower end to the same horizontal extension 33' of the bed frame 33, and these two uprights are rigidly braced together at their upper ends by a short horizontal beam or bridge piece 168. The uprights 167, 167' respectively have inwardly projecting brackets 169, 169' at their upper ends and similar inwardly projecting brackets (not shown) at their lower ends.

The opposite side (seen in Figure 16) of the skeleton frame 166 comprises a pair of vertical parallel uprights 170 and 171 rigidly braced together by a pair of horizontal cross bars 172 and 173. The uprights 170 and 171 are fixed at their lower ends to the top of the gear box 158 (which is itself secured to the adjacent bed frame extension 33'), whilst the upper ends of the uprights 170 and 171 are braced together by a horizontal bridge piece 168' similar to the bridge piece 168 previously described. This second side of the skeleton frame 166 differs from the side first described since the shafts by which the nipping wheels and supporting discs are carried have to be brought beyond this side of the frame to enable the drives to be imparted thereto.

The side of the skeleton frame shown in Figure 16 is furnished at its upper end with a pair of inwardly projecting brackets 174, 174' similar to the brackets 169, 169' previously referred to and has a similar pair of inwardly directed brackets at its lower end, these being shown in Figure 16 and marked 175 and 175' respectively.

The brackets 169, 169' and the corresponding ones at the lower ends of the skeleton frame 166 at the same side thereof as the brackets 169, 169', and the other set of brackets 174, 174' and 175, 175' at the other side of the frame are provided to carry the adjusting screws for the several cross beams, namely the upper cross beam 134, a further upper cross beam 134' and similar lower cross beams 145 and 145'. All these cross beams are independently adjustable in a vertical plane and the arrangement will be well understood from the description given with reference to the cross beam 134 since all the other cross beams are similar thereto.

The adjusting screws 135, already referred to, by which the ends of the beam 134 are carried, are each furnished with a pair of adjusting nuts 137, 138 by which the screws at the two ends of the beam 134, and consequently the beam 134 with its nipping wheels 14 and 15, can be adjusted vertically as desired.

The nipping wheels 14 and 15 are mounted on their shafts 127, 129 and 130 so as to rotate therewith but so as to be capable of axial movement along such shafts, and (as shown in Figure 24 for example) between the nipping wheel 15 of each pair and the nipping wheel 14 of the next pair across the machine, is arranged a compression spring 139. These springs urge the nipping wheels 14 and 15 of each co-operating pair towards one another so as to trap the crest of a corrugation therebetween as indicated in Figure 7. This construction is particularly clearly shown in Figure 24 with reference to the lower rear set of nipping wheels 14', 15'.

A knife-edged or doubly-bevelled supporting disc or wheel 18 is arranged for co-operation with each pair of nipping wheels 14, 15, the said disc being arranged in a vertical plane parallel to those containing the wheels 14 and 15 and all these discs being carried upon horizontal shafts 140, 141 and 142 arranged horizontally across the machine immediately below, and similarly to, the shafts 131, 127 and 129 with which they are parallel.

The discs 18 are rotatable with, but adjustable along their shafts, grub screws 141' being provided to lock the discs in their axially adjusted positions. The peripheral bevelled edge of each disc 18 engages the inside of a corrugation of the pre-formed sheet and extends between the co-operating pair of nipping wheels as is clearly shown in Figures 7 and 24 for example. The discs thus support the corrugation whilst it is being creased by the nipping wheels as shown in Figure 7. Moreover the discs 18 position the nipping wheels on their shafts in the proper positions to receive the crests of the corrugations.

The central supporting-disc shaft 141 is carried by brackets 143 and 144 projecting upwardly from the horizontal lower beam 145 extending across the machine (see Figure 15) and which is adjustable as to height, in the same way as the beam 134 previously described, by means of adjusting screws 146 carried in the brackets 175 on the skeleton frame 166.

The shafts 140 and 142 are respectively carried at their inner ends in bearing brackets 147 and 148 on the lower beam 145 and the outer ends of these shafts are carried respectively in brackets 149 also on the lower beam 145, thus these shafts are also adjustable vertically with the beam 145.

*Delivery rollers, feed belts, and drives for these parts and for the nipping and feed and pre-forming wheels*

The shafts 131, 127 and 132 (Figure 32), the centre section 127 of which carries the central group of the upper nipping wheels 14, 15 and the shafts 130 and 129 carrying the side groups of the upper nipping wheels, are all driven, in the same direction, from a driving shaft 150 which is itself driven through bevel gears 164 and 165 from a vertical splined shaft 151 (see Figure 32) supported in bearings on brackets 162 and 163 on the skeleton framework 166 and in turn driven from a countershaft 152 in the gear box 158 to which the necessary drive is transmittted via shafting 153 and universal joints from a pulley 154 driven by a belt 155 from an electric motor 156, the said shafting being supported in brackets 176, 177 and 178 (Figure 16) on the frame of the machine.

The vertical shaft 151 also transmits the necessary drive through bevel gears 179 and 180 to a horizontal shaft 157 mounted in the bracket 163 and which drives, through gear pinions, the shafts 140, 141 and 142 carrying the supporting discs 18, these discs rotating in the opposite direction to the nipping wheels 14 and 15.

The second set of nipping wheels 14', 15' supported on the lower beam 145, and the co-operating supporting discs 18' carried by the upper beam 134', are respectively similar to, and arranged in a similar manner to, the first set of such wheels; they are also driven from the gear box 158 through a lay shaft 181, a vertical splined shaft 159, bevel gearing, and horizontal shafts 160 and 161 (Figure 32) in precisely the same manner as are the shafts carrying the nipping wheels 14 and 15 and the co-operating supporting discs 18; for this reason detailed explanation of the wheels 14', 15' and 18' and their drive will not be given.

The vertical shaft 151 passes through the appropriate brackets 162 and 163 respectively carried by the cross beams 134 and 145 and the arrangement is such that, as the upper and lower beams 134 and 145 are adjusted vertically together with the shafts carried thereby, the driving bevel wheels 164 and 179 are carried up and down the shaft 151 correspondingly so that the drive is not interrupted to the nipping wheels and supporting discs. A similar arrangement is followed for the second set of nipping wheels and supporting discs 14', 15' and 18'.

The drive is transmitted to all the feed and pre-forming wheels from the shaft 153 (Figures 16 and 32) but as the head 43 of the machine has to be periodically raised and lowered for inspection of the machine, allowance must be made for this in carrying the drive to the feed wheels carried by this head. Thus, as will be seen from the figures referred to, the shaft 107 of the first row of lower feed and pre-forming wheels 11 is driven through the spur gears 182 from a horizontal shaft 183 driven through bevel gears 184 from the shaft 153, the shaft 183 being supported at its outer end in a bracket 178 (Figure 16). Similarly the shafts 118 and 107' of the lower feed and pre-forming wheels 13 and 11' are driven through spur gears 185 from a spur gear 186 on a horizontal shaft 187 driven through bevel gears 188 on the shaft 155, the shaft 187 being supported in the bracket 177 (Figure 16). Finally the shafts 107" and 118', respectively carrying the feed and pre-forming wheels 11" and 13' are driven through spur gears 189 from a spur gear 190 on a third horizontal shaft 191 driven through bevel gears 192 from the shaft 153, the shaft 191 being supported in a bracket 176.

The shafts 105, 119, 105', 119' and 105" of the upper rows of feed and pre-forming wheels are driven in a manner similar to the lower rows of such wheels respectively through the medium of spur gears, short horizontal shafts, 193, 194 and 195 and bevel gearing, from a horizontal shaft 196 extending longitudinally along one side of the head 43 of the machine parallel to the shaft 153 and in the same vertical plane as the latter, the shaft 196 being carried in brackets 197, 198 and 199 on the head 43, see Figure 16. The shaft 196 is furnished at its front end with a bevel wheel 200 fixed thereto and meshing with a bevel wheel 201 through which slidably passes a vertical splined shaft 202 supported in bearing brackets 203 and 204 (Figure 16) respectively carried by the head 43 and bed frame 33 of the machine, the shaft 202 being rotatable in the upper bearing 203 but restrained from axial movement relatively thereto, so that when the head 43 is raised or lowered the shaft 202 moves with the head.

The shaft 202 receives its drive from the shaft 153 through bevel gears 205 and 206 respectively fixed upon the shaft 153 and slidable upon the shaft 202, the arrangement being such that the drive is continuous to the shafts 202 and 196 in spite of the raising and lowering of the head 43 of the machine.

The lower end of the shaft 202 is furnished with a further bevel wheel 207 which meshes with a bevel wheel 208 on a horizontal transverse shaft 209 driving through bevel gears 210 a longitudinal central shaft 211 (see Figures 15, 15A and 32) which, at one end, drives a pair of delivery rollers 212 and 213 carried respectively by vertical shafts 214 and 215 driven through spur gearing 216 in opposite directions from a shaft 217 itself geared by bevel wheels 218 to the shaft 211. At its opposite end the shaft 211 drives, through bevel gears 219, a horizontal cross shaft 220 which drives through bevel gears 221 a vertical feed belt-driving shaft 222, which drives a front roller 223 of a lower feed belt 224, of the paper feed mechanism subsequently to be described.

The shaft 202 also drives through bevel gearing 225 (Figure 32) a horizontal shaft 226 carrying a further roller 227 for the feed belt 224.

The shaft 226 drives through a vertical shaft 228 via bevel gearing 229 and 230, a roller 231 carrying an upper feed belt 232 co-operating with the lower feed belt 224.

The sheet of paper to be pre-corrugated in the machine can be fed between the feed ends of the upper and lower guide plates 6 and 7 in any suitable manner but it is very important that in feeding the paper to the guide plates it should be presented in the manner shown in Figure 35, since as the sheet passes through the machine, it takes the form illustrated in Figure 35 due to the lateral in-drawing of the sheet as the amplitude of the corrugations formed therein increases and the pitch of these corrugations decreases. Thus the sheet is fed into the guide plates 6 and 7 after being passed over what may be referred to as a bowed roller 233 which is clearly shown in Figure 28. The roller 233 consists of a series of relatively short straight sleeves 234 mounted for rotation end-to-end upon the successive straight sections 235 of a shaft 241 in which the successive sections 235 are slightly inclined to one another in a horizontal plane, the shaft conveniently being made up of straight sections having slightly oblique ends and welded together end-to-end.

The roller 233 has the ends of its shaft 235 fixed in a pair of vertical upstanding brackets 236 and 237 fixed respectively to opposite sides of the bed frame 33 (Figure 28) and bows forwardly in a horizontal plane as will be seen from Figures 13, 15 and 28.

The roller 233 forms one of four rollers over which passes the upper feed belt 232 (which is an endless belt, preferably formed of an elastic material), these rollers being the previously mentioned roller 231, which is horizontal, a similar horizontal roller 238 arranged in front of and parallel to the roller 231, and an intermediate horizontal roller 239 which is one of a series of rollers over which passes the lower endless feed belt 224. In passing from the roller 238 over the roller 239 and then over the bowed roller 233, the belt 232 is given a reversed S shape in cross section, as will be clearly seen from Figure 15, and is also given, in the region between the rollers 239 and 233, a curved or bowed form in a direction across the machine, this form being imparted to the belt by the roller 233.

The lower feed belt 224 passes over the rollers 223 and 239 and makes a reverse bend over the roller 233 and then passes under the latter and over the rollers 240, 227 and a tensioning roller 242 carried by levers 243 on a cross shaft 244 and loaded by weights 245 or in any other suitable way, e. g. by spring loading. Thus the belt 224 is given the same form as the belt 232 as it passes over the rollers 239 and 233. Consequently as the sheet of paper 2 is fed by the belt 224 rearwardly between the belts 232 and 224, the sheet is conveyed around the roller 239 and then around the bowed roller 233 and bent to the form shown in Figure 34 and then its leading end 246 passes between the guide plates 6 and 7 and is next engaged by the first set of feed wheels 10, 11, the sheet thereafter proceeding through the machine and eventually taking the form shown in Figure 35 and eventually issuing from the machine as shown in Figure 36 as will subsequently be described.

The shafts for all the rollers 231, 233, 238, 239 and 240 are all carried in the said upstanding brackets 236 and 237 as is clearly shown in Figure 28 whilst the shaft for the roller 227 is carried in the bed frame 33.

The sheets may be fed one by one to the feed belt 224 in any suitable manner, for example manually or by an automatic feed such as is, for example, illustrated diagrammatically in Figure 12, a stack of sheets 2 being carried on an elevator 247 which may be hydraulically or mechanically operated and from which the sheets are conveyed by a suction or other feeder 248 one by one on to an intermediate feed belt 249 which delivers it to the feed belt 224. The method of feeding the sheets to the latter belt is not, however, important to this invention and can be of any suitable form.

After passing through the guide plates 6 and 7 and being pre-formed to corrugated form, and after having the corrugations creased by the nipping wheels as previously described, the sheet with its converging corrugations, is delivered through a horizontal discharge casing 250 of convergent form in plan as is seen in Figure 14, the sheet being prevented from expanding by this casing and being guided, narrower end first, between the hereinbefore mentioned delivery rollers 212 and 213 which are arranged on the vertical shafts 214 and 215 side by side so as to engage the laterally compressed pre-formed sheet between them, the peripheries of these delivery rollers being knurled or otherwise roughened as is clearly seen in Figure 31 to grip the corrugated sheet between them and to continue the feed of the sheet from the machine. The upper side 266 of the discharge casing 250 is in the form of a hinged lid which gives access to the interior of the casing.

Instead of forming each of the belts in one piece they may each be made up of a plurality of separate narrow endless belts running side by side.

*Adjustment of delivery rollers*

The rollers 212 and 213 are driven, as previously described, in opposite directions and their shafts 214 and 215 are mounted for adjustment towards and away from one another. Thus the shafts 214 and 215 are each carried in one end of an H-shaped lever, these levers, being respectively marked 251 and 252 (see Figures 30 and 31) respectively pivoted at the other end upon vertical pivot pins 253 and 254 fixed at their upper and lower ends respectively in the top and bottom of a housing 255 carried by supporting brackets 256 (Figures 12 and 15A) of a rearward extension 257 of the bed frame 33 which may, if desired, also support the hereinbefore-mentioned rack 19 as indicated in Figure 12, this rack being located horizontally behind the delivery wheels 212 and 213. Thus each of the shafts 214 and 215 can swing in an arc respectively about the centre of the pivot pin 253 and the pivot pin 254, the top and bottom of the housing 255 being provided with slots 258 and 259 and 260 and 261 respectively to permit the free movement of the shafts 214 and 215 in the said arcuate path.

The actual adjustment of the shafts 214 and 215 to and from one another is effected from an adjusting screw 262 rotatably mounted centrally in the front side of the housing 255 and carrying a nut 263 at its inner end, this nut being connected by links 264 and 265 respectively to the H-shaped levers 251 and 252 so that, as the screw 262 is rotated, these levers are swung about their pivots 253 and 254 to move the rollers 212 and 213 towards one another or away from one another depending upon the direction of rotation of the adjusting screw 262.

Figure 36 shows diagrammatically how the pre-formed corrugated sheet passes between the delivery rollers 212 and 213 and is fed rearwardly therefrom. On leaving the rollers 212, 213, the sheet expands as indicated in Figure 37 to a more or less uniform width throughout and then further expands to the form shown in Figure 4 in which the width of the sheet is approximately that which it will have when introduced ultimately into the press for the production of laminates. In this condition the sheet 2 is deposited upon the rack 19.

*Head raising and lowering mechanism*

The head 43 is only raised with respect to the bed 33 periodically as, for example, when it is desired to inspect the guide plates 6 and 7 and the various sets of feed and pre-forming wheels associated therewith and this raising, and subsequent lowering, of the head is achieved through the hydraulic cylinders 35, 36, 37 and 38 and the co-operating rams 39, 40, 41 and 42 thereon, these rams being actuated by hydraulic pressure.

The hydraulic fluid is supplied to the hydraulic cylinders 35, 36, 37 and 38 from an intensifier 267 as diagrammatically illustrated in Figure 33 via a series of pipe lines respectively marked 268, 269, 270 and 271. The pressure is applied to the hydraulic fluid in the intensifier 267 by air pressure supplied from an air receiver 272 connected to the intensifier by a pipe line 273 and which air receiver is supplied with compressed air via a pipe line 274 from suitable compressing plant. Thus the air applies pressure to the hydraulic fluid, which is conveniently oil, in the intensifier and this oil is sent, when required, to the lower ends of the hydraulic cylinders 35, 36, 37 and 38 to raise the rams therein and so to raise the head 43 of the machine into the dot-and-dash position indicated at 275, Figure 16.

A main air control valve 276 is provided in the pipe line 273 and a valve 277 is also provided for exhausting the line 273 to atmosphere.

As previously explained the loading on the several rams 39, 40, 41 and 42 is unequal so that the pressure necessary to raise each of these rams at precisely the same rate as the others has to be proportioned to the respective rams according to the load thereon and, to enable this to be done, in each of the pipe lines 268, 269, 270 and 271 is provided a non-return regulatable inlet valve, these valves being respectively marked 278, 278′, 278″ and 278‴. All these inlet valves are of precisely the same construction and each comprises a spring loaded non-return valve (not shown) and means for adjusting the pressure of the spring on the valve and thereby for adjusting the fluid pressure at which the valve opens and the rate of supply of the hydraulic fluid to the hydraulic cylinder controlled by that particular valve. Thus the ram-raising pressure can readily be independently adjusted for each ram.

As one of the said non-return valves is provided for each of the pipe lines 268, 269, 270 and 271, and as each of these pipe lines is also used for exhausting purposes, each pipe line is also provided with a bye-pass, these bye-passes being respectively marked 282, 283, 284 and 285 and in each of these bye-passes is arranged a non-return exhaust valve, these valves being marked respectively 286, 286', 286'' and 286''' and all being identical with one another and similar to the non-return valves 278, 278', 278'' and 278'''. The said exhaust valves are each set appropriately for the fluid flow in its respective bye-pass, each of these valves permitting flow of fluid only in a direction opposite to that in which the corresponding inlet valve permits the fluid to flow.

Although the inlet valves 278, 278', 278'' and 278''' and the exhaust valves, 286, 286', 286'' and 286''' are shown diagrammatically in Figure 33, the arrangement is preferably such that the control handles for these valves are arranged on a control panel 287 on the side of the machine as shown in Figures 15, 15A. The two valves 276, 277 are also arranged on the panel 287 and it will be understood that once the inlet and exhaust valves have been initially set, they need not be interfered with in ordinary circumstances, the lifting of the head 43 being effected by closing the valve 277 and opening the valve 276, whilst the lowering of the head is effected by closing the valve 276 and opening the valve 277.

The panel 287 may also carry the electric switch gear for starting and stopping the electric motor 156 and the compressors supplying air to the air receiver 272; the pressure gauges, and the like.

It will be understood that the head 43 is not positively lowered but returns under the force of gravity, the head descending as the pressure on the several rams is progressively reduced, this being effected in the case of each ram, at the same rate as it was increased to raise the head. In order to determine the precise position at which the downward movement of the head will be arrested, the head is furnished with four stops, two on each side and all precisely the same, these stops being marked 301 (see Figures 13, 13A and 16) and being adapted to engage at their lower ends against the upper ends of similar stops 302 carried by the bed frame 33 of the machine. The stops 302 preferably have screw-threaded axially adjustable abutment posts 303 which can be locked in their adjusted positions by locking nuts 304 so that the precise position at which the head will come to rest when descending can be accurately determined. If desired, and as shown, the stops 301 and 302 may be respectively utilised to support the plates 60 and 61 on the head 43 and the opposite plates 58 and 59 on the bed 33 of the machine as is apparent from Figure 16.

Although it is preferred to make the guide plates 6 of the upper set and the guide plates 7 of the lower set all independent of one another so as to be relatively adjustable, it will be understood that if desired all the guide plates of each set could be made integrally with or fixed to one another but in that case it would not be possible to change the pitch of the corrugations to be produced in the fibrous sheet material without changing the top and bottom guide plates entirely.

Although the machine described above is particularly intended for pleating or pre-forming sheets of fibrous material for use in the manufacture of corrugated plastic laminates by the method above described, it will of course be understood that such a machine could be used for pleating or corrugating sheet material for any other purpose.

*Press platens*

The platens A, B, C and D between which the laminate assemblies are moulded to their final corrugated plastic laminate form have already been referred to and preferably the platens of each pair should be self-aligning and may therefore have, to a limited extent, freedom to float at least in a direction transverse to the lengths of the corrugations in the platens. Moreover according to a further feature of this invention the platens are constructed in a manner which is different from that normally employed. Usually these platens are each made from solid slabs of forged steel which are drilled from end-to-end and cross-drilled, the ends of the appropriate bores being subsequently plugged, to furnish the platens with the necessary internal circuitous passages through which a heating medium, e. g. steam, may flow to heat the platens. These platens are extremely costly to produce. According to this invention, instead of making the platens in the way above referred to, each platen is made in two parts, an upper and a lower part, and at least one of these parts is in the form of an iron casting in which are cast the necessary channels either for the direct conveyance of the heating fluid or to receive metal conduits for this purpose. Thus in the case of an upper platen, such as the platen A, the lower part 288 (Figures 9 and 11) is formed as a rectangular casting in iron, the corrugated surface 24 being moulded on the underside of the member 288 and longitudinal grooves or channels 289 being moulded in the upper side of the member for the reception of a series of parallel metal pipes 290 which are connected together alternately at opposite ends by bridging pipes 291 either to form a single series or two series of tortuous interconnected fluid paths. Preferably the pipes are arranged in two groups, one distributed over each longitudinal half of the platen, steam or other heating fluid being supplied to the conduits by supply pipes 292 and discharged from the conduits by discharge pipes 293 (see Figures 9 and 38). The upper side of the lower platen 288 is covered and closed by a top plate 294 screwed down on to the member 288.

The platen D is similar to the platen A but is, of course, inverted with respect to the platen A and where no intervening platens are used between the platens A and D or where an even number of intervening platens is so used, the corrugated part of the platen D will be of male form when the corrugated part of the platen A is of female form, as shown in Figure 10.

Intermediate platens, such as B and C, are each made up of two similar halves, an upper and a lower half respectively marked 295 and 296 (see Figures 9 and 10 for example), these two halves of the platens being similar in all respects and each being formed with a flat side 297 and a corrugated side 298, the two flat sides of the two halves of the platen being assembled side by side (i. e. the two halves of the platen are assembled back-to-back) and being furnished with longitudinal grooves 299 to receive pipes 300 similar to the pipes 290 previously described for the upper and lower platens A and D and connected together in series in a similar manner to the latter pipes. The two halves of each of the platens B and C are secured together by screws and the conduits 300 are furnished with supply and exhaust pipes as the said platens A and D.

It will be understood that platens constructed as above described are relatively simple to produce and that, should any fault develop in the pipes for the heating fluid, the platens can be opened and the said pipes repaired or replaced without any appreciable difficulty. Moreover there is no necessity to make any fluid-tight joints between the two parts of any one of the platens since the pipes 290 and 300 are themselves fluid-tight and contain the heating fluid without any assistance from the platens.

Moreover it will be appreciated that platens for use in making flat laminates or for any other similar operations requiring heat in the platens, may be constructed, as above described, from iron castings.

*Operation of the machine above described*

The thermo-setting resin employed in conjunction with the fibrous sheet material to be used in making corrugated plastic laminates according to this invention will be one which may be applied to the fibrous material in any suitable way as, for example, by impregnating the fibrous sheets by dipping them in or spraying or brushing them with the resin in solution or emulsion, the resin being applied to the sheet in an uncured condition. The resin employed may be a thermo-setting synthetic resin such as a phenol formaldehyde, cresol formaldehyde, or urea formaldehyde resin, the latter type of resin including not only those synthetic resins made from urea itself but also analogous resins such as, for example, the melamine-formaldehyde resins. Either water or spirit solutions or emulsions of the thermo-setting resins may be employed and it will be understood that the constituent sheets of a laminate assembly will, as will be well understood by those skilled in the laminated plastic art, be consolidated together under temperature and pressure conditions appropriate to the particular resin used in the fibrous sheets, and the general working conditions involved.

Briefly the operation of the machine is as follows:

Assuming that the fibrous sheets to be used have been impregnated with the thermo-setting resin and dried and assuming that initially the stop abutments 303 of the machine have been set so as accurately to determine the extent to which the head 43 should close, this depending upon the thickness of the paper to be fed through the machine; that the upper and lower guide plates have been relatively adjusted to the required setting by means of the cam plates 93 and 94 and 73 and 74; that the valve 277 has been opened and the valve 276 closed, and the head 43 has been lowered; and the motor 156 started, then the machine will be ready to take and preform the sheets of paper successively. The feeder 248 is then started and the sheets fed one after the other to the feed belt 249 which delivers them to the feed belt 224. The latter belt carries each sheet rearwardly and into the decreasing gap (see Figure 15) between itself and the upper feed belt 232. The belts 232 and 224 then carry the sheet endwise over the upper roller 239 and then around the front concave side of the bowed roller 233, the sheet thus being bent through a reverse S form (as seen in cross section) before continuing its rearward movement in a horizontal plane, the front edge of the sheet passing between the upwardly and downwardly turned front ends of the guide plates 6 and 7 after which the sheet continues to pass rearwardly between these guide plates.

After passing between the guide plates for a short distance, the forward feed, and the initial pre-forming of the sheet to corrugated form, is assisted by the first row of upper and lower feed and pre-forming wheels 10 and 11 which act on the sheet along the crest lines of the lower guide plates 7 and so displace the sheet upwardly along these lines out of its initial plane, the sheet being restrained against upward displacement along the base ridges of the upper guide plates 6 by the wearing strips 82' on the latter.

As the sheet continues its rearward movement between the guide plates 6 and 7, its front edge ultimately reaches and passes between the first row of feed and pre-forming wheels 12 and 13 of the second series of such wheels, these wheels 12 and 13 acting at the bases of the shallow corrugations so far formed in the sheet by the action of the guide plates thereon. The wheels 12 and 13 then assist in feeding the sheet rearwardly and the sheet now passes to the second row of feed and pre-forming wheels 10' and 11' of the first series of such wheels, the wheels 10' and 11' acting, like the first row of feed wheels 10 and 11, upon the crests of the partially pre-formed sheet. The sheet continues its rearward movement and then passes between the second row of feed and pre-forming wheels, i. e. wheels 12' and 13', of the second series of these wheels, like the wheels 12 and 13, act upon the bases of the corrugations in the sheet and pass the latter to the third row of feed and pre-forming wheels 10" and 11" of the first series, these wheels 10" and 11" acting upon the crests of the sheet.

A machine having the several sets of wheels as described is found to be satisfactory but it should be understood that additional sets of feed and pre-forming wheels may be employed if desired.

On leaving the feed and pre-forming wheels 10" and 11", the sheet passes rearwardly to the first set of nipping and supporting wheels 14, 15 and 16. Thus as will be seen from Figure 24, each crest 3 of the pre-formed corrugated sheet will pass between a pair of the nipping wheels 14, 15 and will there be definitely creased along this crest as hereinbefore described with reference to Figure 7, the crest being sustained meanwhile by the co-operating supporting wheel 16.

The sheet then passes further rearwardly and the bases 4 of its corrugations pass, as shown in Figures 7 and 24, through the second set of nipping wheels 14', 15' and are likewise definitely creased whilst being positioned in these nipping wheels by the supporting wheels 16' Thus, the pre-formed sheet continues rearwardly until it completely leaves the nipping wheels when each corrugation in the sheet will have been creased along its entire length both at its crest and at its base.

As it leaves the nipping wheels, the sheet passes through the discharge casing 250 in a convergent form and eventually passes to and between the delivery wheels 212 and 213, the arrangement being such that the sheet enters these wheels before entirely leaving the nipping wheels so that there is no interruption in its rearward movement. The wheels 212 and 213 deliver the pre-formed sheet on to the rack 19, the sheet expanding laterally as previously described as it passes to this rack and the location of the sheet accurately on the rack conveniently being assisted by an operative.

Pre-forming and creasing the fibrous sheets as above described ensures that, when the sheets are superposed one upon the other to form a laminate assembly, the fibrous sheets retain their corrugated form to a large extent so that when these sheets are subsequently placed between the co-operating moulds by which they are to be consolidated into a finished corrugated laminate, the moulding operation does not involve any marked drawing of the material of the said fibrous sheets inwardly transversely of the widths of the sheets so that the latter are not stressed in this direction detrimentally by the pressing operation and consequently the danger of fracturing the fibrous sheets is eliminated.

Moulding laminates

When sufficient pre-formed fibrous sheets have been superposed on the rack to form a single laminate, a flexible or limp separating layer is placed thereon and another pile of corrugated sheets is assembled thereabove, when another separating sheet is placed on this second assembly and a further plurality of corrugated sheets is assembled on this separating layer. This assembly operation is continued until sufficient assemblies of pre-formed sheets have been collected on the rack 19, when these several assemblies are placed between the cover plates 26 and 27 with a sepaarting layer between each such plate and the adjacent assembly, and the whole is transferred to the press and placed between a pair of platens, for example the platens A and B, wherein the assemblies of sheets are heated and compressed and moulded to their final consolidated and corrugated laminate form.

After the heating and pressing operation, the laminates are removed from the press, are separated from one another, and the separating layers are stripped therefrom. The laminates are then trimmed along their edges to remove flash and irregularities.

Where the paper used for the fabrication of the laminates is suitable, the finished laminates will have mutually moulded decorative surfaces as previously explained, and where it is desired to produce a hammered or like finish on the upper surface of the upper laminate and the lower surface of the lower laminate produced in each daylight, a moulding layer or layers of unimpregnated appropriate paper, e. g. kraft paper, which has been pre-formed to the required corrugated form may be placed (also as previously described) respectively above and below the upper and lower separating layers of the group of laminate assemblies and between this group of assemblies and the plates 26 and 27 as previously explained.

It will be appreciated that in pre-forming the sheets 2 to the corrugated character, regard will be paid to the dimensions of the corrugations to be produced in these sheets so as properly to relate them, as hereinbefore described, to the pitch of the corrugations of the finished laminates.

Corrugated laminates made in accordance with this invention may be of any suitable linear dimensions and of any appropriate thickness, but they will normally be made of dimensions around 8 feet long by 4 feet wide and of between $\frac{1}{16}$ and $\frac{1}{8}$ of an inch thick, as mentioned above.

The heat, pressure, and curing time values employed in producing the laminates will correspond substantially to those which would be used in making flat laminates of similar dimensions and in similar quantities; the determination of these values will therefore be readily effected by those skilled in the plastic laminate art. Similarly the quantities of resin to be used will be well understood.

Instead of pre-forming individual sheets as hereinbefore described, in some cases it may be desirable to feed the impregnated paper to the pre-forming machine continuously from a paper mill or even from a reel; in that case the paper would advance through the machine above described in the same way as the sheets already referred to but it would be necessary at some stage to cut the pre-formed corrugated paper into appropriate lengths and this could be done, if desired, by some such arrangement as is shown, by way of example, in Figure 39 where, on issuing from the delivery wheels 212 and 213, the corrugated pre-formed paper is confined between lateral guides 305 and is periodically severed automatically by a guillotine 306 operated from any suitable source, e. g. through the medium of an electric trip switch against which the paper is adapted to engage as it is fed past the guillotine, this automatically causing the guillotine to sever the paper which would then be suitably moved out of the path of the on-coming corrugated paper from the pre-forming machine. Well-known electro-mechanical contrivances could be used for controlling the guillotine and need not be further described herein.

The corrugated plastic laminates produced as above described may be sold and used in their natural colour which will depend to a large extent upon the colour of the paper used in its production or at least on the colour of the outer sheets used in manufacturing the laminate, and upon the nature of the resin employed. Where the resin is phenol formaldehyde resin the laminates will usually be of a buff or brown colour. However, where it is desired that the laminates should have other colours, they may be sprayed on one or both sides with appropriate paints or enamels and dried, if desired with the aid of an infra-red ray lamp.

We claim:

1. Method of manufacturing a corrugated plastic laminate from flexible fibrous sheet material impregnated with a thermo-setting resin, such method comprising preforming the fibrous sheet material to a preliminary form having numerous corrugations, the crests of which are spaced from one another by a distance (measured at right angles to the lengths of the corrugations and along the surface of the sheet) approximately equal to the spacing of the crests of the corrugations to be finally formed in the plastic laminate, assembling a plurality of sheets of such preformed material in superposed relationship with the corrugations thereof in register and then compressing the laminate assembly thus produced between cooperating heated molds having corrugated surfaces whose corrugations are substantially in register with those of the sheet material and conform in their dimensions and shape to those to be produced in the finished plastic laminate, to thereby impart the required final corrugated form of the laminate assembly and to consolidate the sheets of which same is composed into a single integral corrugated laminate.

2. Method of manufacturing a corrugated plastic laminate from flexible fibrous sheet material impregnated with thermo-setting resin, such method comprising preforming the fibrous sheet material to a preliminary form having numerous side-by-side corrugations which approximately correspond to the required final corrugations of the plastic laminate, creasing such preliminarily corrugated sheet material along lines respectively substantially centrally of the crests and bases of the corrugations formed in the material, thereby to impart an enduring set to the material along these lines, the immediately adjoining creases so produced being spaced from one another by a distance (measured at right angles to the lengths of the creases and along the surface of the sheet) substantially equal to half the distance (measured in the same manner) between the longitudinal center lines of succeeding crests of the corrugated laminate to be produced, assembling a plurality of sheets of such preformed and creased material in superposed relationship with the corrugations thereof in register, and then compressing the laminate assembly thus produced between cooperating heated molds having surface corrugations substantially in register with those of the sheet material and conforming in dimensions and shape to those to be produced in the finished plastic laminate, to thereby impart the required final corrugated form of the laminate assembly and to consolidate the sheets of which same is composed into a single integral corrugated laminate.

3. A method of manufacturing a corrugated plastic laminate from flexible fibrous sheet material impregnated with a thermo-setting resin, such method comprising preforming fibrous sheet material to a preliminarily corrugated form and creasing said material along parallel lines respectively disposed substantially centrally of the crests and bases of the corrugations formed in the material, thereby to impart an enduring set to the material along these lines, the immediately adjoining creases so produced in said material being spaced from one another by a distance (measured at right angles to the lengths of the creases and along the surface of the sheet) substantially equal to half the distance (measured in a like manner) between the longitudinal centre lines of successive crests of the corrugated laminate to be produced; assembling a plurality of sheets of the said pre-formed material in superposed relationship to form a laminate assembly; stacking a plurality of such laminate assemblies in superposed relationship with a limp separating layer, which is impermeable to and incompatible with the said thermo-setting resin, between successive laminate assemblies introducing the said stack of laminate assemblies between a pair of co-operating heated moulds having corrugated moulding surfaces whose corrugations conform in their dimensions and shape to those to be produced in the finished plastic laminate, imparting through said moulds heat and pressure to the laminate assemblies to consolidate each of them into a corrugated plastic laminate, and subsequently removing the laminates so produced from between the corrugated moulds and separating them.

4. A machine for pre-forming planary flexible sheet material to a preliminarily pleated form, such machine comprising driven feed means for frictionally engaging and feeding the sheet material edgewise through the machine in the direction in which the pleats are to extend along the material, sheet-engaging means adapted to act on the sheet material as it advances edgewise through the machine, on one side thereof and along one set of laterally spaced straight lines, further sheet-engaging means adapted similarly to act upon the other side of the said sheet material and along a further plurality of laterally spaced straight lines alternating with the first mentioned straight lines and centrally disposed therebetween, at least the sheet-engaging means acting on said sheet material along one of the said sets of straight lines being arranged to displace the material perpendicularly out of its original plane to a progressively increasing extent as the material is advanced through the machine and thereby to pleat the sheet material, such sheet-engaging and displacing means also simultaneously progressively drawing the said sheet material laterally inwardly transversely of its direction of feed in order to compensate for the said progressively increasing displacement of the material perpendicularly from its original plane, said means for progressively displacing the said sheet material transversely from its own plane including co-operating nesting guide plates adapted for the passage of the said sheet material therebetween and which guide plates are shaped in cross section so as to impart the said progressively increasing pleated form to sheet material passed therebetween.

5. A machine for pre-forming flexible sheet material to a preliminarily corrugated form, such machine comprising driven feed means for frictionally engaging the sheet material on opposite sides thereof and for feeding such material edgewise through the machine in the direction in which the corrugations are to extend along the material; two series of side-by-side convergent guide plates arranged in spaced co-operative relationship to furnish therebetween a gap for the edgewise passage therethrough of the sheet material as the latter is fed through the machine, said guide plates being so shaped that the said gap is of substantially planary form at the feed end of the machine but progressively assumes from this end a transversely corrugated form, the corrugations of the gap gradually increasing in amplitude and decreasing in width towards the discharge end of the machine whereby, as the said sheet material is fed by the said feed means through the said gap, such material is displaced by said guide plates perpendicularly out of its original plane along convergent straight lines to a progressively increasing extent and is simultaneously drawn inwardly in a direction transverse to its line of feed.

6. A machine according to claim 5 wherein all the guide plates of the said two series are similar to one another, each guide plate being flat at its feed end but gradually assuming from this end towards the other end, a V-shaped cross sectional form of progressively increasing amplitude and decreasing maximum width, but the guide plates of one series being inverted, and also arranged in overlapping alternating nesting relationship, with respect to the guide plates of the other series so as to define the said corrugated gap between the two series of guide plates.

7. A machine for pre-forming flexible sheet material to a preliminarily corrugated form, such machine comprising a base frame and a head movable at will towards and away from said base frame; driven feed means for frictionally engaging the sheet material on opposite sides thereof and for feeding such material edgewise through the machine in the direction in which the corrugations are to extend along the material; two series of side-by-side convergent guide plates arranged in spaced co-operative relationship to furnish between them a gap for the passage of the sheet material edgewise therebetween, the said two series of guide plates being carried respectively by the said head and the said base frame and those guide plates of the two series being so shaped that the said gap is of substantially planary form at the feed end of the machine but progressively assumes from this end a transversely corrugated form, the corrugations of the gap gradually increasing in amplitude and decreasing in pitch towards the discharge end of the machine whereby, as the sheet material is fed by the said feed means through the said gap, the sheet material is displaced along convergent straight lines perpendicularly out of its original plane to a progressively increasing extent whilst the sheet material is simultaneously drawn inwardly in a direction transverse to its line of feed.

8. A machine according to claim 7 including means for simultaneously and correspondingly adjusting all the guide plates of each of the said series of such plates towards or away from one another to vary the pitch of the corrugations to be produced in the sheet material passed through the machine.

9. A machine for pre-forming flexible sheet material to a preliminarily corrugated form, such machine comprising a base frame and a head movable at will towards and away from said base frame; two entirely separate series of driven feeding and pre-forming wheels each including a plurality of pairs of wheels, the wheels of each pair of each series being adapted frictionally to engage the said sheet material on opposite sides thereof and the wheels of each pair of one series of wheels being adapted to engage the sheet material along one of a plurality of straight lines extending in side-by-side laterally spaced relationship in the direction in which the corrugations are to be formed in the sheet material whilst the wheels of each pair of the other series of said wheels are adapted to engage the sheet material along one of a plurality of further straight lines centrally disposed between the straight lines of the first said set of such lines, the said pairs of wheels of each series being arranged in a plurality of rows spaced along the machine and extending thereacross, bearing means for supporting on the head of the machine those wheels which are to engage that surface of the sheet material, as it passes through the machine, which is to be nearest to said head, and bearing means on the said base frame for supporting those wheels which are to engage that surface of the said sheet material which is to be nearest to the said base frame when the sheet material passes through the machine; two similar series of side-by-side convergent guide plates arranged in spaced relationship to provide between them a gap for the passage of the sheet material edgewise therethrough, the said two series of guide plates being respectively carried by the said head and base frame, and each of the said guide plates of each series being substantially flat at the feed end thereof but gradually assuming from this end towards the other end a V-shaped cross sectional form of progressively increasing amplitude and decreasing maximum width, the guide plates of one series being inverted, and also arranged in overlapping alternating nesting relationship, with respect to the guide plates of the other series so that the said gap defined between the two said series of guide plates is of substantially uniplanar form at the feed end thereof but progressively assumes from this end a transversely corrugated form, the corrugations of said gap gradually increasing in amplitude and decreasing in pitch towards the discharge end of the machine; and the said straight lines along which the said feeding and pre-forming wheels of the one series are adapted to engage the sheet material being located along the crest lines of the said transversely corrugated gap and the straight lines along which the pairs of wheels of the other series are adapted to engage the sheet material being located along the base lines of the said transversely corrugated gap whereby, as the sheet material is fed through the machine, it is progressively caused to assume a transversely corrugated form, the sheet being progressively displaced perpendicularly out of its original plane along straight convergent lines and simultaneously drawn laterally inwardly to compensate for the said perpendicular displacement thereof.

10. A machine according to claim 9, wherein each pair of said feeding and pre-forming wheels of each of the said series comprises a peripherally grooved wheel and a peripherally bevelled wheel having its periphery operating in the groove of the grooved wheel, both wheels rotating about parallel axes and in a common plane.

11. A machine according to claim 9 wherein all the feed and pre-forming wheels of each row of each series of such wheels and on each side of the gap through which the sheet material to be corrugated is to be passed, are driven by a common driving shaft which extends in a horizontal plane in a forwardly bowed manner across the machine.

12. A machine for pre-forming flexible sheet material to a preliminarily corrugated form, such machine comprising a base frame and a head movable at will towards and away from said base frame; two entirely separate series of driven feeding and pre-forming wheels arranged in spaced rows across the machine, each said series including a plurality of pairs of wheels and the wheels of each pair of each series being adapted respectively frictionally to engage the said sheet material on opposite sides thereof and to feed it through the machine; a driving shaft for each row of said wheels, such shaft extending in a horizontal plane in a forwardly bowed manner across the machine and comprising a plurality of short straight sections arranged end-to-end across the machine and each carrying one of the said wheels; universal joints for connecting together the adjacent ends of adjoining shaft sections, and bearings for supporting each of said shafts at intervals across the machine, the bearing for supporting the shafts of the wheels adapted to engage the sheet material on one side thereof being carried by the said head whilst the bearings for supporting the shafts of the wheels which are adapted to engage the other side of the said sheet material are carried by the said base frame; two similar series of side-by-side convergent guide plates arranged in spaced relationship to provide between them a gap for the passage of the sheet material edgewise therethrough, the said two series of guide plates being respectively carried by the said head and the said base frame; the said guide plates each being substantially flat at the feed end thereof but gradually assuming from this end towards the other end a V-shaped cross-sectional form of progressively increasing amplitude and decreasing maximum width, and the guide plates of one series being inverted, and also arranged in overlapping alternating nesting relationship, with respect to the guide plates of the other series so that the said gap defined between the two said series of guide plates is of substantially uniplanar form at the feed end of the machine but progressively assumes from this end a transversely corrugated form, the corrugations gradually increasing in amplitude and decreasing in pitch towards the discharge end of the machine; and said sheet feeding and pre-forming wheels of the one series being adapted to engage the sheet along the crest lines of the said transversely corrugated gap and the pairs of wheels of the other series being adapted to engage the sheet along the base lines of the said gap whereby, as the sheet material is fed through the machine, it is progressively caused to assume a transversely corrugated form, the sheet being progressively displaced perpendicularly out of its original plane along straight convergent lines and simultaneously drawn laterally inwardly to compensate for the said perpendicular displacement thereof.

13. A machine according to claim 12 wherein the said wheels are all adjustable along their shafts; the said guide plates of each series are adjustable at their delivery ends towards and away from one another; means are provided for effecting the adjustment of such guide plates to vary the pitch of the corrugations to be produced in the sheet material passed through the machine; and means on said guide plates for automatically and correspondingly adjusting the said wheels along their shafts when the said guide plates are adjusted.

14. A machine for pre-forming flexible sheet material to a preliminarily corrugated form, such machine comprising driven feeding means for frictionally engaging and feeding the sheet material edgewise through the machine in the direction in which the corrugations are to extend along the material, sheet-displacing means adapted to engage the sheet material on opposite sides thereof as it is fed through the machine and to displace such sheet material to a progressively increasing extent transversely out of its original plane along straight lines extending, at predetermined laterally spaced positions, along the sheet in the direction in which it is fed, and for simultaneously progressively drawing the sheet material inwardly laterally, transversely of the direction of the said lines, in order to compensate for the said progressively increasing displacement of the material transversely from its original plane, thereby to avoid any very substantial stressing of the material in a direction transverse to the said lines as a result of the said transverse displacement of the material from its original plane, and means for then receiving and creasing the corrugations formed in the said sheet material centrally along their crests and bases in order to impart to the corrugations an enduring set, such creasing means comprising nipping wheels adapted to act externally upon the said corrugations adjacent the crests and bases thereof so as to nip together the adjoining marginal portions of the sides of the corrugations immediately adjacent the crests and bases thereof.

15. A machine for pre-forming flexible sheet material from a planary to a preliminarily corrugated form, such machine comprising driven feeding wheels for frictionally engaging the sheet material on opposite sides thereof and for feeding such material edgewise through the machine in the direction in which the corrugations are to extend along the material, sheet-engaging means adapted to contact the said sheet material on opposite sides thereof as it is fed through the machine and to displace such material to a progressively increasing extent transversely out of its original plane along straight lines extending at predetermined laterally spaced positions along the sheet in the direction in which it is to be fed and for simultaneously progressively drawing the sheet material laterally inwardly transversely of the direction of the said lines in order to compensate for the said progressively increasing displacement of the sheet material transversely from its original plane; and nipping means for creasing the corrugations formed in the said sheet material centrally along their crests and bases respectively in order to impart to said corrugations an enduring set, such creasing means comprising pairs of nipping wheels adapted to act externally upon the said corrugations adjacent the crests and bases thereof so as to nip together the adjoining marginal portions of the sides of the corrugations immediately adjacent the crests and bases thereof, there being one pair of nipping wheels for each of the crests and bases to be formed in the sheet material and some of said pairs of nipping wheels being adapted to act upon the crests of the corrugations in the pre-formed corrugated material whilst the other pairs of nipping wheels are adapted to act on the bases of the corrugations of such material.

16. A machine for pre-forming flexible sheet material to a preliminarily corrugated form, such machine comprising a base frame and a head movable at will towards and away from said base frame; two similar series of side-by-side convergent guide plates arranged in spaced relationship to provide between them a gap for the passage of the said sheet material edgewise therethrough one of said series of guide plates being carried by the said head and the other series of such plates being carried by the said base frame; said guide plates each being substantially flat at the feed end thereof but gradually assuming from this end towards the other end a V-shaped cross-sectional form of progressively increasing amplitude and decreasing maximum width and the guide plates of the one series being inverted, and also arranged in overlapping alternating nesting relationship, with respect to the guide plates of the other series so that the said gap is of substantially uniplanar form at the feed end of the machine but progressively assumes from this end a transversely corrugated form, the corrugations gradually increasing in amplitude and decreasing in pitch towards the discharge end of the machine; two separate series of driven feeding and pre-forming wheels each including a plurality of pairs of wheels, the wheels of each pair of each series being adapted frictionally to engage the said sheet material on opposite sides thereof and to feed it through the said gap, and the pairs of wheels of each series also being arranged in a plurality of forwardly bowed rows spaced along and extending across the machine, bearing means on the head of the machine for supporting those wheels which are to engage that surface of the said sheet material nearest to said head and bearing means on the said base frame for supporting those wheels which are to engage that surface of the sheet material nearest to the said base frame; said feeding and pre-forming wheels of the one series being adapted to engage the said sheet material along the crest lines, and the pairs of wheels of the other series of such wheels being adapted to engage the sheet material along the base lines, of the said transversely corrugated gap whereby, as the sheet material is fed through the machine, it is progressively caused to assume a transversely corrugated form, the sheet being progressively displaced perpendicularly out of its original plane along straight convergent lines and simultaneously drawn laterally inwardly to compensate for the said perpendicular displacement thereof; means for receiving the corrugations formed in the sheet material and for creasing them centrally along their crests and bases respectively to impart an enduring set to the corrugations, such creasing means comprising a pair of peripherally flared nipping wheels for, and in alignment with, each of the crests and bases of the said gap, means for resiliently urging together the nipping wheels of each pair, a supporting wheel for co-operation with each pair of nipping wheels such supporting wheel being adapted to engage the pre-formed sheet material on the opposite side thereof to its co-operating nipping wheels and having its periphery projecting between the peripheries of these nipping wheels, driven shafts respectively for said nipping wheels and said supporting wheels, and bearing means for supporting said driven shafts.

17. A machine according to claim 16, wherein the said nipping wheels and supporting wheels are respectively mounted on driven shafts so as to be axially adjustable thereon, and wherein means are provided for adjusting the shafts of the said nipping wheels and the shafts of the corresponding supporting wheels relatively towards and away from one another.

18. A machine according to claim 16 including a pair of driven delivery rollers for continuing the traversal of the pre-formed sheet material out of the machine after it leaves the said nipping wheels.

19. A machine according to claim 9, wherein the means for feeding the sheet material to the feed ends of the said guide plates includes a forwardly bowed sheet-bending roller extending across the machine across the direction of edgewise feed of the sheet material, and means for maintaining said sheet material in contact with said bowed roller as it passes thereover in order to impart a transversely bowed form to the sheet material to compensate for the convergent form imparted thereto by the pre-forming of corrugations therein.

20. A machine for pre-forming flexible sheet material to a preliminarily corrugated form, such machine comprising driven feed means for frictionally engaging the sheet material on opposite sides thereof and for feeding the material edgewise through the machine in the direction in which the corrugations are to extend along the material; sheet-engaging means adapted to contact the sheet material on opposite sides thereof as it is fed through the machine and to displace such material to a progressively increasing extent transversely out of its original plane along straight lines extending, at predetermined laterally spaced positions, along the sheet in the direction in which it is fed; a forwardly bowed sheet-bending roller extending horizontally across the machine in front of the said means for progressively displacing the sheet material transversely out of its original plane, and means for maintaining the said sheet material in contact with said bowed roller as it passes thereover in order to impart a transversely bowed form to the sheet material to compensate for the convergent form imparted thereto by the pre-forming of corrugations therein, and nipping means for receiving the corrugations formed in the said sheet material and for creasing them centrally along their crests and bases respectively in order to impart an enduring set to the corrugations.

21. A method of fabricating simultaneously a plurality of thermo-set plastic laminates having longitudinal corrugations and all having at least one surface provided with a moulded pattern, such method comprising stacking a plurality of laminate assemblies in superposed relationship with a limp separating layer sandwiched between each pair of adjacent laminate assemblies; said assemblies each comprising a plurality of superposed sheets of kraft paper each impregnated with thermosetting resin and pre-formed to a pleated form and said limp separating layers each being formed by a pliable non-resilient layer which is moisture-proof and incompatible with and impermeable to the resin contained in the laminate assemblies; applying pressure and heat to the stack of laminate assemblies between corrugated moulds to cause the laminate assemblies to coact with one another through the said limp separating sheets as mutual moulding elements, the bunched surface fibres of each laminate assembly of each pair of successive assemblies impressing themselves into the adjacent surface of the other assembly of the pair so as to produce an irregular surface pattern extending over at least one surface of each laminate produced, and to cause the consolidation of the laminate assemblies into laminates; removing the stack of laminates produced from the press; and separating such laminates.

DESIRÉ GONDA.
ALFRED ANSELL HODGE.

References Cited in the file of this patent

UNITED STATES PATENTS

| Number | Name | Date |
|---|---|---|
| 654,884 | Ferres | July 31, 1900 |
| 793,316 | McMillin | June 27, 1905 |
| 1,772,686 | Rahr | Aug. 12, 1930 |
| 1,859,354 | Buttress | May 24, 1932 |
| 1,906,342 | Smith | May 2, 1933 |
| 2,163,063 | Romanoff | June 20, 1939 |
| 2,276,035 | Guhl | Mar. 10, 1942 |
| 2,300,760 | Amigo | Nov. 3, 1942 |
| 2,319,267 | Sawyer | May 18, 1943 |
| 2,335,208 | Harrop | Nov. 23, 1943 |
| 2,397,388 | Troedsson | Mar. 26, 1946 |
| 2,405,528 | Skolnik | Aug. 6, 1946 |
| 2,431,720 | Willey | Dec. 2, 1947 |
| 2,442,422 | Loetscher | June 1, 1948 |
| 2,496,911 | Green | Feb. 7, 1950 |
| 2,526,945 | Gray | Oct. 24, 1950 |